United States Patent
Seshadri et al.

(10) Patent No.: US 10,694,189 B1
(45) Date of Patent: Jun. 23, 2020

(54) ADAPTIVE USE OF SEARCH MODES BASED ON BANDWIDTH AVAILABILITY

(71) Applicant: Amazon Technologies, Inc., Seattle, WA (US)

(72) Inventors: Kiran Kalkunte Seshadri, Cedar Park, TX (US); Asif Khan, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/357,120

(22) Filed: Mar. 18, 2019

(51) Int. Cl.
| | |
|---|---|
| *H04N 19/139* | (2014.01) |
| *H04N 19/109* | (2014.01) |
| *H04N 19/15* | (2014.01) |
| *H04N 19/107* | (2014.01) |
| *H04N 19/176* | (2014.01) |
| *H04N 19/523* | (2014.01) |
| *H04N 19/105* | (2014.01) |

(52) U.S. Cl.
CPC ......... *H04N 19/139* (2014.11); *H04N 19/105* (2014.11); *H04N 19/107* (2014.11); *H04N 19/109* (2014.11); *H04N 19/15* (2014.11); *H04N 19/176* (2014.11); *H04N 19/523* (2014.11)

(58) Field of Classification Search
CPC .... H04N 19/61; H04N 19/139; H04N 19/176; H04N 19/105; H04N 19/96; H04N 19/70; H04N 19/147; H04N 19/513; H04N 19/52; H04N 19/33; H04N 19/51; H04N 19/103; H04N 19/44

See application file for complete search history.

(56) References Cited

U.S. PATENT DOCUMENTS

| | | | |
|---|---|---|---|
| 2011/0170602 A1* | 7/2011 | Lee ...................... | H04N 19/139 375/240.16 |
| 2012/0051433 A1* | 3/2012 | Roji ...................... | H04N 19/61 375/240.16 |
| 2014/0016693 A1* | 1/2014 | Zhang ................ | H04N 21/2343 375/240.02 |

(Continued)

OTHER PUBLICATIONS

U.S. Appl. No. 16/357,084, filed Mar. 18, 2019 Titled "Adaptive Use of Search Modes Based on Neighboring Blocks".

*Primary Examiner* — Neil R Mikeska
(74) *Attorney, Agent, or Firm* — Kilpatrick Townsend & Stockton LLP

(57) ABSTRACT

Reference data is one type of data that the video accelerator may frequently be read from external memory. In various examples, the video accelerator can adaptively select inter-prediction modes based on the bandwidth to external memory that is available at any point in time. The video accelerator can determine the amount of bandwidth that is available, and when the bandwidth is insufficient for obtaining reference data for all possible inter-prediction modes, the video accelerator can select an inter-prediction mode based on the size of the reference window associated with the inter-prediction mode, the size being within an amount of data that can be read with the available bandwidth. The video accelerator can then obtain a reference window from external memory, and perform prediction using the selected inter-prediction mode and the reference window.

21 Claims, 14 Drawing Sheets

(56) References Cited

U.S. PATENT DOCUMENTS

| | | | |
|---|---|---|---|
| 2014/0044162 A1* | 2/2014 | Guo | H04N 19/52 375/240.02 |
| 2014/0355677 A1* | 12/2014 | Kondo | H04N 19/136 375/240.12 |
| 2019/0037227 A1* | 1/2019 | Holland | H04N 19/53 |

* cited by examiner

1100

Determining a particular amount of bandwidth that is available for obtaining reference data from an external memory wherein a fixed amount of bandwidth is available to the integrated circuit device for obtaining data from the external memory, and wherein the particular amount of bandwidth is determined at a particular point in time
1102

Selecting an inter-prediction mode from a plurality of inter-prediction modes, wherein the inter-prediction mode is selected based on a size of a reference window associated with the inter-prediction mode, the size being within an amount of data that can be read from the external memory using the particular amount of the bandwidth available at the particular point in time
1104

Reading the reference frame from the external memory
1106

Performing prediction for the block of the video data using the inter-prediction mode and the reference window
1108

Determining a particular amount of bandwidth that is available for obtaining reference data from an external memory, wherein a fixed amount of bandwidth is available to the integrated circuit device for obtaining data from the external memory, and wherein the particular amount of bandwidth is determined at a particular point in time
1202

↓

Determining that the particular amount of bandwidth is insufficient for obtaining reference data for first inter-prediction mode of a plurality of inter-prediction modes
1204

↓

Determining, for a block of video data, a prediction mode used by a neighboring block
1206

↓

Determining to use a second inter-prediction mode of the plurality of inter-prediction modes based on the encoding parameters of the neighboring block
1208

↓

Obtaining a reference window for the second inter-prediction mode based on the encoding parameters of the neighboring block
1210

↓

Performing prediction for the block of video data using the second inter-prediction mode and the reference window
1212

FIG. 12

ADAPTIVE USE OF SEARCH MODES BASED ON BANDWIDTH AVAILABILITY

BACKGROUND

Video encoding is a process by which raw video data captured by a digital camera is encoded and compressed into a smaller size. The encoded data, which can also be referred to as an encoded bitstream, can be more easily stored and/or transmitted than the raw video data. A decoding process can approximately reconstruct the raw video data from the encoded bitstream. Examples of codecs for encoding and decoding video data include Advanced Video Coding (AVC, also referred to as H.264), High Efficiency Video Coding (HEVC, also referred to as H.265), Versatile Video Coding (VVC, also referred to as Future Video Coding (FVC) and H.266), and various standards defined by the Motion Pictures Experts Group (MPEG), among other examples.

Video encoding and decoding are computationally intensive processes, thus in time-critical applications dedicated coding hardware can be used. For example, a video accelerator can be implemented using an integrated circuit device. By being purpose-built to perform only video encoding and/or decoding, the video accelerator can perform these operations much faster than would a general purpose processor running an encoding or decoding program.

Video encoding and decoding can also be resource intensive, in terms of memory needed to store encoded data, unencoded data, and any intermediate data generated during the coding process. A video accelerator may be taxed by resource needs such as these, and may need to accommodate available resources in view of time criticality.

BRIEF DESCRIPTION OF THE DRAWINGS

Various examples will be described with reference to the drawings, in which:

FIG. 11 includes a flowchart illustrating an example of a process for coding video data;

FIG. 12 includes a flowchart illustrating an example of a process for coding video data;

DETAILED DESCRIPTION

Figure 1:
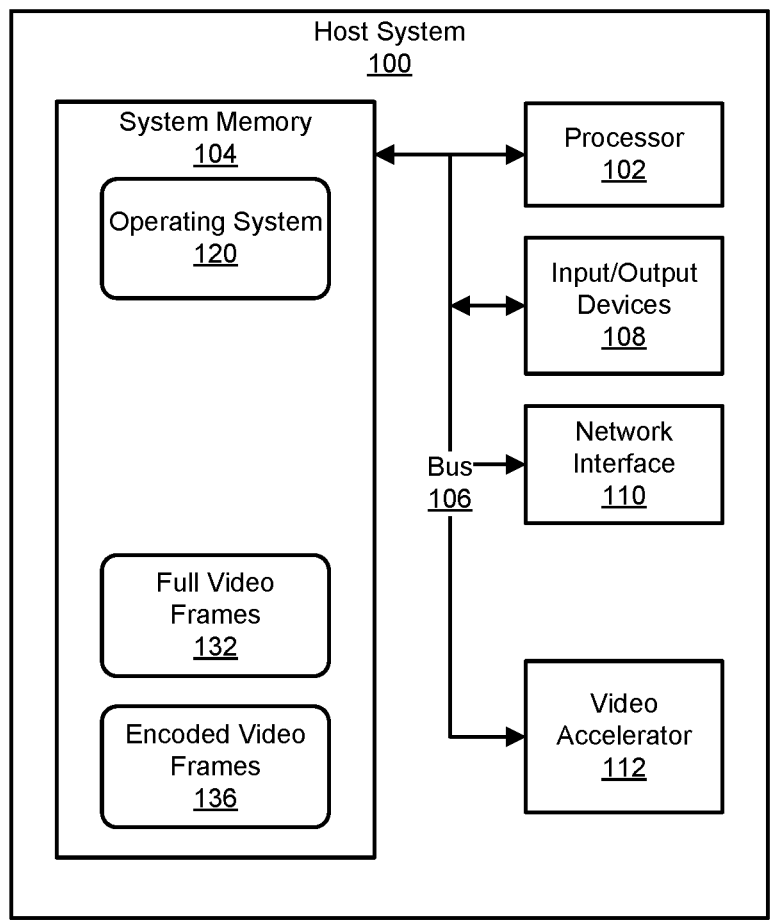
FIG. 1 includes a block diagram illustrating an example of a host system that can include an integrated circuit device implementing a video accelerator.

An integrated circuit device that implements a video accelerator can have a limited amount of internal memory. The amount of memory that can be included in the device may be limited by factors such as the overall size of the device and a cost target for the device, among other factors. Video coding, however, involves large amounts of data. For example, raw video frames, as captured by a digital camera, can be quite large, such as about 50 megabits per frame for a frame that is 1920 pixels wide by 1080 pixels high. In this example, one second of video data, captured at 60 frames per second (fps), is about 3 gigabits in size. As another example, to take advantage of temporal redundancy between sequential frames, the device may be referring to up to three video frames at a time: a previous frame and a next frame, which are both already encoded, and a current frame, which may be only partially encoded.

Much of the data involved in an encoding or decoding process may thus be stored in a memory that is external to the video accelerator, such as the system memory of the computing device in which the video accelerator is operating. The video accelerator can read data, as needed, from the external memory into the device's internal or local memory. The video accelerator can further write completed data (e.g., components of an encoded bitstream or decoded video pixels) to the external memory to free up the device's internal memory for other uses.

There are physical limitations, however, on the amount of data that the video accelerator can read from the external memory. The video accelerator can be connected to the external memory using a bus, and the bus can have a fixed amount of bandwidth. For example, the bus may support a bandwidth of 1000 megabytes (MB) per second. This amount of bandwidth may be sufficient when the video accelerator is coding one stream of video data at a time, but in some cases the video accelerator may be simultaneously coding multiple streams of video data. In these cases, the video accelerator can allocate portions of the available bandwidth among the multiple streams, so that none need to wait for others to finish in order to be able to access data in external memory. This means, however, that the amount of bandwidth that is available to each stream is less than all of the available bandwidth. Additionally, the amount of bandwidth that is available to an individual stream may be less than the allocated amount, due to some of the bandwidth having been already used to read data from the external memory.

Delays in obtaining data from external memory can lead to delays in the coding process and output of the final data. For example, the coding process may call for reading 100 kilobytes of reference data from the external memory, but the video accelerator may find that currently available bandwidth only allows for reading 50 kilobytes at the moment that the reference data is needed. In this example, the video accelerator can wait until sufficient bandwidth is available, but the waiting can delay output of the final data. In many applications, such as in the processing of video data for live streaming, any noticeable delay may not be acceptable.

Reference data is one type of data that the video accelerator may frequently be read from external memory. Reference data is a portion of an encoded frame that the video accelerator can use to perform prediction for a block of video data from a frame that is currently being coded. The size of the reference data is determined by the prediction mode being used to predict the block of video data. In various examples, the video accelerator can include logic, implemented using integrated circuitry, that can adaptively select inter-prediction modes based on the bandwidth to external memory that is available at any point in time. For example, the video accelerator can determine a size for reference data that can be obtained from the external memory, and can enable one or more inter-prediction modes that can use the reference data, or can perform an inter-prediction mode on a smaller reference window. As another example, the video accelerator can selectively enable inter-prediction modes for a particular block based on the inter-prediction modes used to predict blocs that neighbor the particular block. Doing so can take advantage of spatial similarity between the blocks. Various other techniques can also be employed, separately or in combination with these techniques. These techniques can reduce the amount of reference data read by the video accelerator, so that the video accelerator need not wait for sufficient bandwidth in order to proceed with performing predictions.

The video accelerator is also referred to herein as a coding device. "Coding" can refer to encoding, decoding, or both encoding and decoding.

Various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

FIG. 1 includes a block diagram illustrating an example of a host system 100 that can include an integrated circuit device implementing a video accelerator 112. The illustrated host system 100 is an example of a computing device, and also includes a processor 102, a system memory 104, various Input/Output (I/O) devices 108, and at least one network interface 110. In the example of FIG. 1, the host system 100 also includes video accelerator 112, which is an integrated circuit device that can accelerate the processing of video data. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the full video frames 132 can be captured by another device and be sent to the host system 100 (e.g., over the network interface 110) for encoding by the acceleration engine 112. As another example, decoded video frames produced by the acceleration engine 112 can sent from the host system 100 to another computing device for display by the other computing device.

The processor 102 is an integrated circuit device that can execute program code, in the form of instructions. The program code can be for various software applications or tools, such as an operating system 120. While the processor 102 is executing a program, the instructions for the program can be stored in the system memory 104. The instructions can also be stored elsewhere, such as on a storage device, and can be loaded into the system memory 104 when needed by the processor 102. The processor 102 can also use the system memory 104 for temporary storage of other data on which the processor 102 is operating. In various examples, the system memory 104 is a volatile memory type, such as a type of Random Access Memory, though non-volatile memory types can, alternatively or additionally, be used for the system memory 104.

The various Input/Output devices 108 can include user input and output devices, such as keyboards, mice, touch screens, microphones, display screens, speakers, printers, and scanners, among other examples. The Input/Output devices 108 can also include other peripheral device, such as storage devices. A storage device is an example of a device that can include non-volatile memory. For example, the storage device 10 can be a magnetic disk drive, a solid state drive, or an optical drive, among other examples. The storage device can further be non-transitory, such that program code and other data stored on the storage device remains present when the storage device is not powered on.

The network interface 110 and the acceleration engine 112 are also examples of I/O devices. The network interface 110, which can be implemented using a network interface card, can provide access to one or more networks. The network interface 110 can include, for example, a physical port for connecting a network cable and/or wireless antennas for communicating with Wi-Fi and/or cellular networks.

The video accelerator 112 is a device that is purpose built to perform certain operations that can be performed by the processor 102, but can be performed faster by the video accelerator 112. In the example of FIG. 1, the video accelerator 112 is purpose-built to perform video encoding and/or decoding, and can include hardware and possibly also software that is dedicated to these operations. In some examples, the video accelerator 112 performs both encoding and decoding. In some examples, the video accelerator 112 performs only encoding or decoding.

Encoding video data involves processing raw video frames, referred to here as full video frames 132, and producing encoded video frames 136, which can be captured in a bitstream. In some examples, the host system 100 can receive raw video data, which is unprocessed data from a the image sensor of a digital camera from a camera included among the Input/Output devices 108. Alternatively or additionally, raw video data can be received over the network interface 110 from a network location. The processor 102 can subsequently configure the video accelerator 112 to process the full video frames 132 from the raw video data and output encoded video frames 136.

Decoding video data involves reading encoded video frames 136, encoded into a bitstream, and reconstructing the video frames from which the video data was encoded. The reconstructed video frames are also referred to here as full video frames 132. The host system 100 can have an encoded bitstream stored on a storage device among the Input/Output devices 108, and/or an receive an encoded bitstream over the network interface 110.

Because the video accelerator 112 may have a limited amount of on-board or local memory, the host system 100 can store the full video frames 132 and the encoded video frames 136 in the system memory 104. The video accelerator 112 can read the full video frames 132 and/or the encoded video frames 136 as needed during the coding process. To communicate with the system memory 104, the video accelerator 112 can be connected to a bus 106 that enables intercommunication between the components of the host system 100. In some examples, the bus 106 is a dedicated connection between the system memory 104 and the video accelerator 112, meaning that no other devices use the bus 106. In some examples, the video accelerator 112 does not communicate directly with the system memory 104, and instead communicates with the system memory 104 through the processor 102. In these examples and other examples, the processor 102 and/or the video accelerator 112 can include a Direct Memory Access (DMA) engine that manages the transfer of data between the system memory 104 and the video accelerator 112.

In various examples, the bus 106 can be a limiting factor in how quickly the video accelerator 112 can read data from the system memory 104, and/or how much data the video accelerator 112 care read at any given point in time. For example, the bus 106 may support maximum bandwidth of 100 GB per second; that is, the devices on the bus 106 can read about 100 GB of data over the course of one second. Further to this example, if the video accelerator 112 reads 90 GB over in the span of 500 milliseconds (ms), the video accelerator 112 will only be able to read another 10 GB over the next 500 ms. Note that the values in the preceding example are only approximations, in that bandwidth is generally measured as an average over time, and instantaneous bandwidth, or bandwidth available at a point in time, may be computed over a window of time. Availability of the bus 106 is further reduced when the bus 106 is shared among multiple devices. For example, the video accelerator 112 may be sharing the bus 106 with other Input/Output devices 108. As another example, the video accelerator 112 may be coding multiple video streams at the same time, and thus may be attempting to use the same amount of bandwidth simultaneously read data for different streams. In this example, less bandwidth will be available for each individual stream.

Data that the video accelerator 112 reads from the system memory 104 can include a current frame to be coded and reference data used in performing motion compensation during the coding process. In encoding, motion compensation is a process by which the video accelerator 112 finds a block (referred to as a reference block) from a previously encoded frame (referred to as a reference frame), that is similar in appearance to a current block that is being encoded. In the encoded bitstream, the video accelerator 112 can, for the current block, encode only the difference between the current block and the reference block, rather than encoding all the information for the current block. In decoding, motion compensation includes locating in an encoded frame (also referred to as the reference frame) the reference block referred to by a current block being decoded, and reconstructing the current block from the reference block.

In both the encoding and decoding processes, the video accelerator 112 may be operating on a current frame, and may also be referring to one or two reference frames. When performing intra-prediction, the current block being coded and the reference block are both in the current frame. In this situation, the reference block may be in the onboard memory of the video accelerator 112 as part of previously encoded data or previously decoded data. Thus, at least in some cases, when the video accelerator 112 performs intra-prediction, the video accelerator 112 may not need to read reference data from the system memory 104.

When the video accelerator 112 performs inter-prediction, the reference block is in a temporally different frame from the current frame, either the previous frame or the next frame in display order. To find the reference block, the video accelerator 112 may check both the previous frame and the next frame, depending on the configuration of the video accelerator 112. The on-board memory of the video accelerator 112 may not be sufficiently large to store an entire reference frame as well as the data for the current frame being coded. Thus, the video accelerator 112 may obtain reference data from the encoded video frames 136 in the system memory 104. The reference data can be in the form of reference windows, also referred to as search windows, which include an area of a reference frame that may be centered around the location of the current block, and which may be smaller in size than all of the reference frame. Once the video accelerator 112 has searched a reference window, the video accelerator 112 can discard the data for the reference window and load another reference window into local memory.

The reference data may constitute a large amount of the data that the video accelerator 112 reads from the system memory 104. To obtain the best motion compensation result, the video accelerator 112 may try each of multiple inter-prediction modes, and select the best outcome (where "best" is measured, for example, using a cost function that determines the similarity between the current block and the reference block). The best motion compensation result can correspond to the highest possible compression rate. Each inter-prediction mode may be associated with a reference window (also referred to as a search window) of a different size. In some examples, the video accelerator 112 may read a reference window from the system memory 104 for each inter-prediction mode that is attempted. In these examples, the video accelerator 112 may need a large amount of the available bandwidth on the bus 106 for each block being coded. When the bandwidth is not available, the video accelerator 112 can wait until bandwidth is available, but waiting would result in the output of the video accelerator 112 being delayed.

In various examples, the video accelerator 112 can incorporate techniques for adaptively selecting inter-prediction modes and reference windows. The video accelerator 112 can select inter-prediction modes and/or reference windows based on the bandwidth currently available to the video accelerator 112, so that the video accelerator 112 can proceed with motion compensation instead of waiting for bandwidth to be available. The video accelerator 112 may not produce the best motion compensation result, due to the number of inter-prediction modes attempted being limited and/or the reference windows not corresponding exactly to a size or area dictated by the inter-prediction mode that is used. The video accelerator 112, however, may be able to maintain an output data rate, which may be a higher priority than obtaining the best compression rate.

Figure 2:
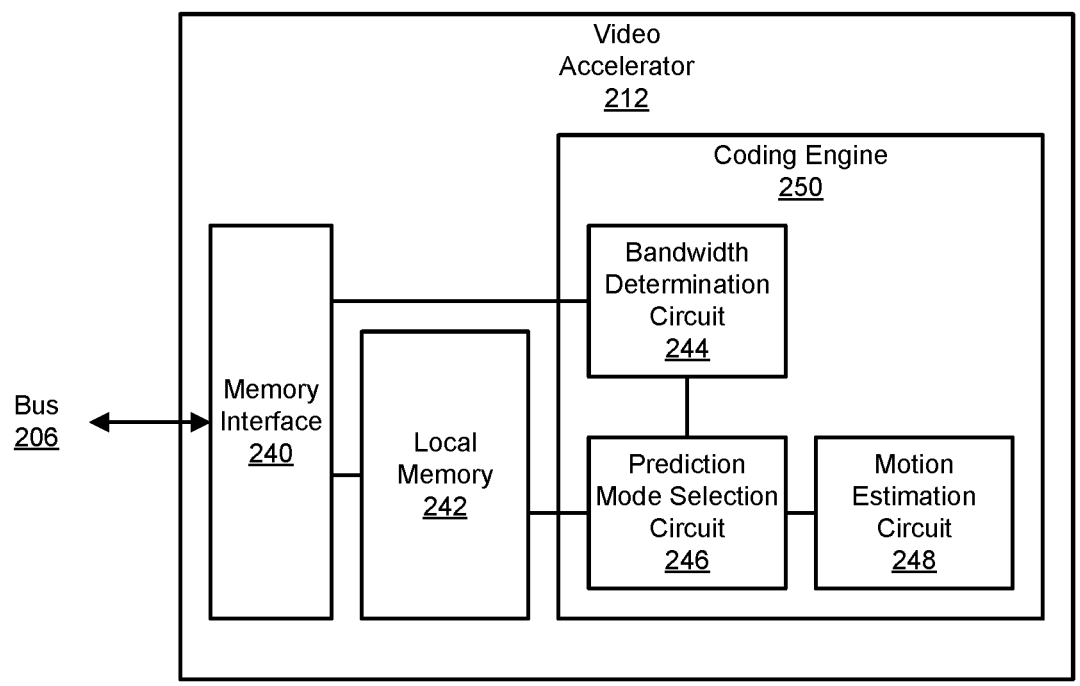
FIG. 2 includes a block diagram illustrating an example of a video accelerator.

FIG. 2 includes a block diagram illustrating an example of a video accelerator 212. The example video accelerator 212 can be an integrated circuit device, such as an Application Specific Integrated Circuit (ASIC) or Field Programmable Gate Array (FPGA) designed to implement the logical blocks illustrated in FIG. 2. The video accelerator 212 can be used for the video accelerator illustrated in FIG. 1. The video accelerator 212 illustrated in FIG. 2 includes a memory interface 240 for communicating with an external bus 206, a local memory 242, and a coding engine 250. The video accelerator 212 can include other components that are not illustrated here. These and other components of the video accelerator 212 can be implemented using integrated circuitry. In some examples, some of the functionality of these components can be implemented using program code stored on or that cane loaded onto the video accelerator 212, such as microcode or firmware.

In various examples, the memory interface 240 provides a communication interface for the video accelerator 212 with the bus 206. The memory interface 240 can, for example, formulate read and write transactions to a memory external to the video accelerator 212, and can monitor the transactions until each transaction is completed. The memory interface 240 can also place data returned for read requests into the local memory 242.

In some examples, the memory interface 240 can also monitor transactions sent by the video accelerator 212 onto the bus 206, and from these transactions determine a current bandwidth usage by the video accelerator 212. For example, the memory interface 240 can be configured with the amount of bandwidth on the bus 206 that is available to the video accelerator 212. In this example, the memory interface 240 can keep track of each transaction that is pending (e.g., not yet completed) and the size of each transaction. Using an estimate of the amount of time that completion of a transaction may take, the memory interface 240 can then approximate the amount of bandwidth that is available at any given point in time. For example, if the bus 206 has 100 GB per second of bandwidth that is available to the video accelerator 212, when the video accelerator 212 has five pending read transactions that each read 100 MB and are each expected to take 20 ms to complete, then the amount of bandwidth available to the video accelerator 212 when the last of the five transactions is initiated is approximately 95 GB per second.

The coding engine 250 can perform coding of video data, which can include encoding and/or decoding. To perform coding, the coding engine 250 can read a video frame from an external memory, or a part of a video frame, and can perform coding on the video frame. The coding engine 250 can then write a result of the coding to the external memory.

In the example of FIG. 2, the coding engine 250 includes a bandwidth determination circuit 244, a prediction mode selection circuit 246, and a motion estimation circuit 248. The coding engine 250 can include other components for the coding processes, as discussed further below with respect to FIGS. 13 and 14 and which are not illustrated here.

In various examples, the bandwidth determination circuit 244 can determine a current amount of bandwidth that is available on the bus 206 for the video accelerator 212 to use to obtain reference data. In some examples, the bandwidth determination circuit 244 determines the available amount of bandwidth from the bandwidth calculations performed by the memory interface 240. In some examples, the bandwidth determination circuit 244 can determine the available bandwidth from the current status of the coding process. For example, the bandwidth determination circuit 244 can keep track of the encoding parameters of the most recent n coded blocks that precede a current block being coded. In this example, the parameters used to encode the most recent n blocks can indicate an amount of bandwidth that is available to code the current block. As an example, the available bandwidth will be less when the most recent blocks were coded using an inter-prediction mode, because coding of these blocks may have necessitated reading reference data from an external memory. As another example, the available bandwidth will be less when the most recent blocks were coded with small partitions, since each partition may have cause the video accelerator 212 to read a reference window. As another example, the available bandwidth may be greater when the most recent blocks were coded using an intra-prediction mode, because, for intra-prediction, the reference window may have already been in the local memory 242 and no data may have been fetched from outside the video accelerator 212.

Other operations by the video accelerator 212 can also use some bandwidth, and the bandwidth determination circuit 244 can also track these operations to determine the bandwidth available for obtaining reference data. As an example, the video accelerator 212 will read in data for a current frame that is being coded, and will write out coded data. In this example, the amount of bandwidth used by these operations can also be accounted for by the bandwidth determination circuit 244. As another example, the bandwidth determination circuit 244 can keep track of access patterns to the external memory. Some access patterns, when used on certain types of memory, can negatively affect the latency for reading or writing data. For example, multiple, rapid activation of the same row in a memory can cause leakage between neighboring memory cells that may need to be corrected by the memory or by a host processor and thus leave the memory temporarily unavailable. As another example, paging, or the moving of data from system memory to disk or from disk into memory, can also occupy bandwidth on the bus. In some examples, the bandwidth determination circuit 244 can monitor the bus 206 for these types of accesses to the memory, and can compute available bandwidth based on these accesses.

In various examples, the prediction mode selection circuit 246 can use the available bandwidth determined by the bandwidth determination circuit 244 to determine prediction modes and reference windows to be used by the motion estimation circuit 248 to perform prediction on the current block. In some examples, the prediction mode selection circuit 246 only selects between inter-prediction modes, and another circuit of the engine 250 selects between intra-prediction modes. In some examples, the prediction mode selection circuit 246 can select from among both inter-prediction modes and inter-prediction modes. Intra-prediction modes may be able to use prior blocks from the current frame as reference data, and these blocks may be stored in the local memory 242. Thus, at least in some cases, the prediction mode selection circuit 246 may not be restricted in selecting intra-prediction modes.

Reference data for inter-prediction modes, however, is obtained from temporally different frames than the current frame. Data for the reference frames may be located in an external memory, and, for at least some modes, the video accelerator 212 may not be able to read a reference window due to insufficient bandwidth being available on the bus 206. In these situations, the prediction mode selection circuit 246 can adaptively determine which inter-prediction modes the motion estimation circuit 248 can use, and/or which reference frames can be used. Various techniques the prediction mode selection circuit 246 can use to make these determinations are discussed in greater detail below. These techniques include, for a current block being coded, selecting an inter-prediction mode based on the prediction mode used to predict neighboring blocks to the current block; determining an amount of data that can be read without delay, and selecting an inter-prediction mode and/or reference window based on this amount; reducing the size of a search area and reducing the size of a reference window correspondingly; disabling sub-pixel searches when such search increase the size of the reference window beyond what can be read without delay; sharing of reference windows between inter-prediction modes; and other techniques, as discussed further below.

The inter-prediction mode or modes and the reference windows determined by the prediction mode selection circuit 246 can be provided to the motion estimation circuit 248 for performing prediction on the current block. For encoding, prediction can include finding a reference block within the reference window that is similar to the current block. For decoding, prediction can include reconstructing the current block from the reference block. Encoding and decoding can include many other steps, which are outside the scope of this discussion.

Figure 3:
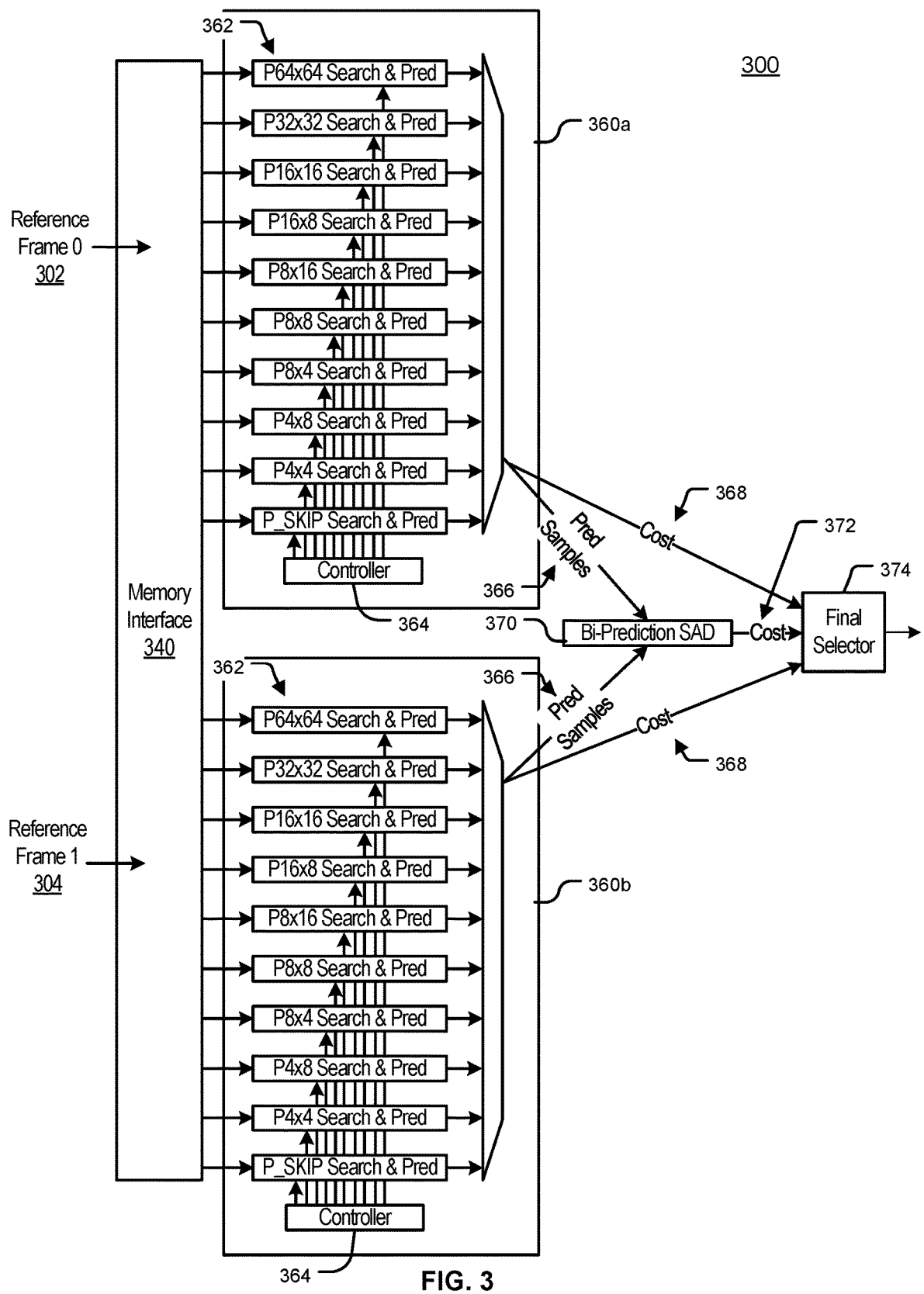
FIG. 3 includes a block diagram illustrating in greater detail an example of a circuit for performing inter-prediction.

FIG. 3 includes a block diagram illustrating in greater detail an example of a circuit 300 for performing inter-prediction. The example circuit 300 can be part of a larger circuit that performs video encoding and/or decoding. The circuit 300 includes a memory interface 340 for communicating with a memory, a first prediction circuit 360*a*, a second prediction circuit 360*b*, a bi-prediction cost calculator circuit 370, and a final selector circuit 374. The memory interface 340 can correspond to the memory interface illustrated in FIG. 2, and the prediction circuits 360*a*-360*b* can be components of the motion estimation circuit of FIG. 2. The inputs to the circuit 300 of FIG. 3 include a block of video data (not shown) from a video frame that is in the process of being coded, and reference data from one or more reference frames. The output of the circuit 300 is a prediction result that will be used to encode the block in an encoding process, or reconstruct the block in a decoding process.

The memory interface 340 can provide the circuit 300 with an interface for communicating with a memory that is storing reference data. In some examples, the memory is on the same device as the circuit 300, and may be referred to as local memory. In some examples, the memory is external to the device, and may be referred to as external memory. In various examples, the memory interface 340 can monitor read transactions generated by the circuit 300 for reading reference data from external memory. In these examples, the memory interface 340 can determine a current memory bandwidth usage by the circuit 300. For example, the memory interface 340 can keep track of pending read transactions, the size of the data requested by each read transaction, how long each transaction has been pending, and/or when each transaction is expected to complete. In this example, the information about each read transaction can be used by the memory interface 340 to determine an approximation of the amount of memory bandwidth currently being used by the circuit 300. The memory interface 340 can further compare the amount of bandwidth being used against the amount of bandwidth that is available to the circuit 300, and thereby determine an amount of the bandwidth that is still available to the circuit 300.

In the example of FIG. 3, the memory interface 340 can receive reference data from a first reference frame, Reference Frame 0 302, and/or a second reference frame, Reference Frame 1 304. The circuit 300 receives reference data from one reference frame (e.g., Reference Frame 0 302) when performing uni-prediction, and from two reference frames when performing bi-prediction. In some cases, the reference data may come from a local memory, in which case reading of the reference data does not count against the available memory bandwidth. In some cases, the reference data is read from external memory, in which case reading of the reference data is accounting for in the bandwidth usage by the circuit 300.

To perform prediction, the circuit 300 includes two essentially identical prediction circuits 360*a*-306*b*, which can perform the same prediction functions on the same block of video data but with different reference data. The prediction circuits 360*a*-360*b* each include a set of search and prediction units 362 and a controller 364 that enables and configures the search and prediction units 362. The multiple search and prediction units 362 can each implement a different inter-prediction mode. The various inter-prediction modes can be defined by the coding standard implemented by the circuit 300.

An inter-prediction mode can be based on the partition size of the block. In various examples, the coding process can divide the current block being coded into smaller partitions, which may individually have a better match in the reference data than does the entire block. In the example of FIG. 3, 64×64 indicates a block size of 64 pixels wide and 64 pixels high, and represents an unpartitioned block. The size 32×32 indicates a block partition of 32 pixels wide by 32 pixels high, and the current block can have four such partitions. Examples of the number of partitions the current block can be divided into and the sizes of each partition are further indicated in Table 1 below. Note that the current block being coded can also be referred to as a prediction unit. Other types of inter-prediction modes include skip mode and merge mode, among others. In skip mode, the residual data of the current block is not encoded, and instead the block can be reconstructed entirely from the reference block. In merge mode, the motion information for the current block is not independently coded, and is instead derived from the reference block. Other inter-prediction modes, including other for other block sizes or block size partitions, are possible.

Each inter-prediction mode implemented by the search and prediction units 362 can further use a reference window of a different size. The size of the reference window can be associated with the block partition size. For example, the search and prediction unit for the 64×64 unpartitioned block size can use a reference window that is 67 pixels wide by 67 pixels high. Table 1 below illustrates further example reference window sizes for the different inter-prediction modes illustrated in FIG. 3. The reference window sizes for the different inter-prediction modes can be defined by the coding standard implemented by the circuit 300.

TABLE 1

| Mode | Num of Partitions per Prediction Unit | Window Size Width | Window Size Height | Total Pixels Per Partition | Total Pixels Read Per Prediction Unit | Memory BW per mode (GB/s) |
| --- | --- | --- | --- | --- | --- | --- |
| P64 × 64 | 1 | 67 | 67 | 4489 | 4489 | 1.090827 |
| P32 × 32 | 4 | 35 | 35 | 1225 | 4900 | 1.1907 |
| P16 × 16 | 16 | 19 | 19 | 361 | 5776 | 1.403568 |
| P16 × 8 | 32 | 19 | 11 | 209 | 6688 | 1.625184 |
| P8 × 16 | 32 | 11 | 19 | 209 | 6688 | 1.625184 |
| P8 × 8 | 64 | 11 | 11 | 121 | 7744 | 1.881792 |
| P8 × 4 | 128 | 11 | 7 | 77 | 9856 | 2.395008 |
| P4 × 8 | 128 | 7 | 11 | 77 | 9856 | 2.395008 |
| P4 × 4 | 256 | 7 | 7 | 49 | 12544 | 3.048192 |
| P_SKIP | 1 | 19 | 19 | 361 | 361 | 0.087723 |
| B_SKIP (spatial) | 1 | 19 | 19 | 361 | 361 | 0.087723 |

The search and prediction units 362 each search a respective reference window for a reference block that matches the current block being coded. The searching can be performed, for example, in a raster scan order, a reverse raster scan order, an up-and-down order, or in a spiral order (from the center outwards), for example. The search and prediction units 362 identify the best-matching reference block using a loss function or a cost function that measures the difference between the current block and a candidate reference block. Alternatively or additionally, the search and prediction units 362 can use a Sum of Absolute Differences (SAD) function, which measures the similarity between the current block and the reference block.

Once a search and prediction unit identifies a best-matching reference block, the search and prediction unit can generate a prediction. Forming a prediction can include determining differences between the selected reference block and the current block being coded. These difference can be referred to as prediction samples 366. The prediction can further include a motion vector that indicates a difference in location between the location of the current block within the current frame and the reference block within the reference frame.

The controller 364 of each of the prediction circuits 360a-360b can determine which of the search and prediction units 362 should be activated for the current block being coded. The controller's selection of inter-prediction modes can be based on factors such as the current coding situation (e.g., whether the current slice is an I-slice or a P-slice), a current configuration of the circuit 300 (e.g., a target encoding data rate), and/or other factors. In the best case, the controller 364 would enable all the search and prediction units 362 on the assumption that one will produce the most compact coding for the current block. The controller 364 can then look at the cost computed by each of the search and prediction units 362 and select the inter-prediction mode that produced the lowest cost.

Each of the search and prediction units 362, however, may trigger reading of a reference window, and it may be the case that the circuit 300 does not have sufficient bandwidth for each of the search and prediction units 362 to read a reference window. Rather than stalling until sufficient bandwidth is available to read the reference windows for each of the inter-prediction modes, the controller 364 can selectively enable inter-prediction modes for which a reference window can be available. A reference window can be available for different reasons. For example, the reference window can be small enough to be read with the currently available bandwidth. As another example, the reference window, or a portion of the reference window, may be present in local memory because the reference window was used to code a pervious block. As another example, the size of the reference window can be reduced to an amount that can be read using the available bandwidth. Various considerations the controller 364 can examine, and decisions the controller 364 can make in determine which of the search and prediction units 362 to enable, are discussed in greater detail below.

For uni-prediction, the prediction samples 366 and motion information output by the first prediction circuit 360a can be used to code the current block. When bi-prediction is enabled, the circuit 300 can input the prediction samples 366 from each of the first prediction circuit 360a and the second prediction circuit 360b into a bi-prediction cost calculator circuit 370. The bi-prediction cost calculator circuit 370 can examine the differences between the prediction samples 366 output by the prediction circuits 360a-360b, and can output a cost 372 associated with using bi-prediction to predict the current block. The cost 372 output by the bi-prediction cost calculator circuit 370 and the cost 360 computed by the prediction circuits 360a-360b can be input into a final selector circuit 374, which can determine whether performing uni-prediction or bi-prediction results in a more compact encoding for the current block.

Various examples of techniques the controller 364 can employ to enable or disable prediction modes, and/or to obtain reference windows, will be described with respect to FIGS. 4-10. Techniques may be described individually, but can also be implemented by the controller 364 in various combinations. In various examples, a coding device can include configuration registers that can be used to individually enable or disable each of the techniques discussed below. These configuration registers can further include fields for controlling how each technique is performed. Using these configuration registers, a coding device can be programmed to enable inter-prediction mode selection techniques that are the most suited for the system in which the coding device is being used. For example, some of the techniques can produce better compression and/or reconstructed video frames in a streaming video system, or when the video content is a sports event or other fast moving content, or when the video content is primarily static.

Figure 4:
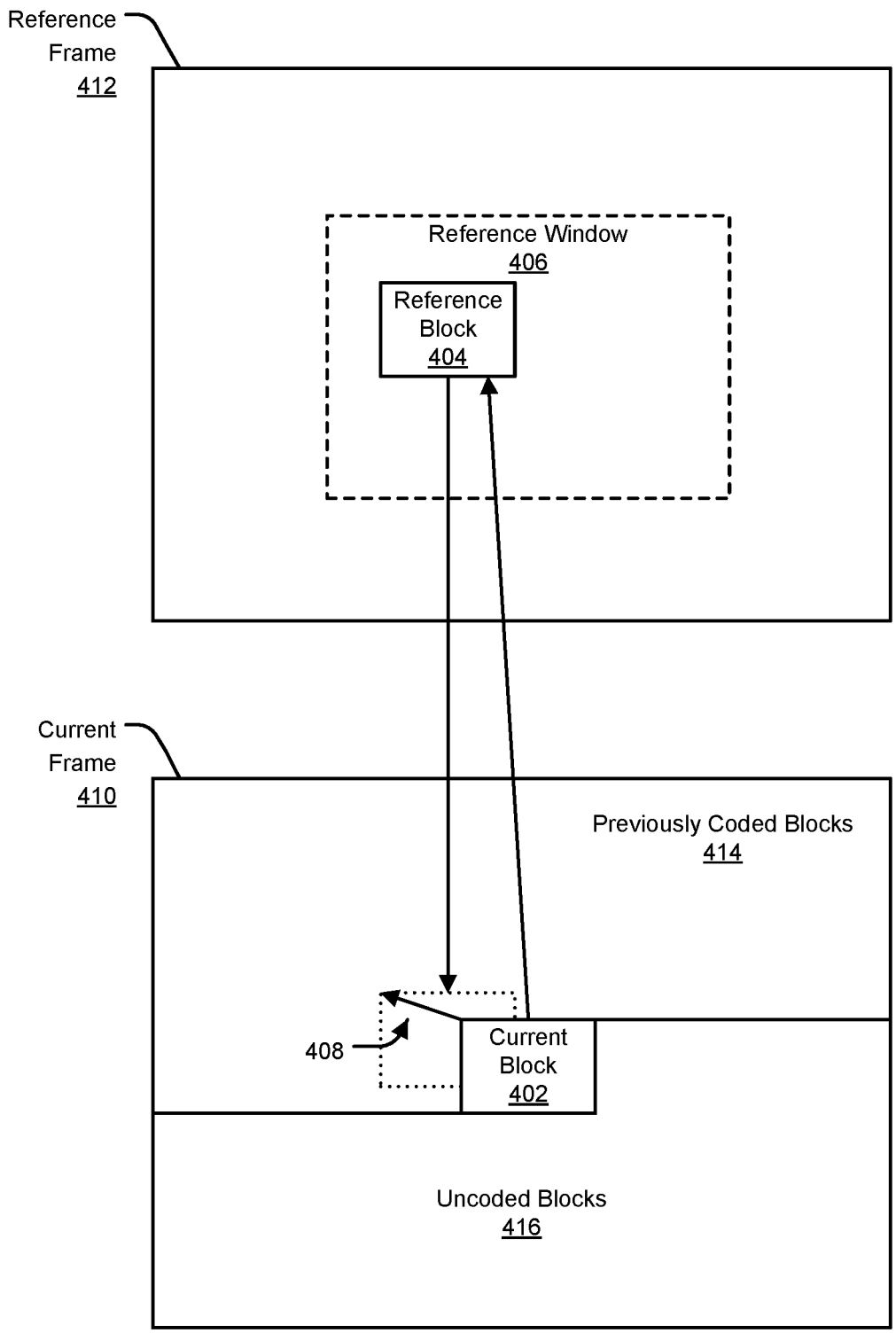
FIG. 4 includes a block diagram illustrating an example of a searching procedure for inter-prediction.

FIG. 4 includes a block diagram illustrating an example of a searching procedure for inter-prediction. Performing inter-prediction can include searching a reference window 406 in a reference frame 412 for a reference block 404 that is a best match for a current block 402 in a current frame 410. Given the current block 402 and the reference window 406, an integrated circuit such as the search and prediction units of FIG. 3 can perform the searching that is illustrated in FIG. 4.

In the example of FIG. 4, the current frame 410 is a video frame that is in the process of being encoded or decoded. The reference frame 412 is a temporally different frame from the current frame 410, and may precede or follow the current frame 410 in display order. The reference frame 412 is an unencoded frame. In an encoding process, the reference frame 412 is a previously encoded frame, which has been reconstructed to be used as a reference frame. In a decoding process, the reference frame 412 is a previously decoded frame.

The current frame 410 includes a number of previously coded blocks 414 and a number of uncoded blocks 416. In an encoding process, the previously coded blocks 414 include blocks that have already been encoded, and the uncoded blocks 416 include blocks that have yet to be coded. In a decoding process, the previously coded blocks 414 include blocks that have already been processed and reconstructed, and the uncoded blocks 416 include blocks that have not yet been reconstructed. In the example of FIG. 4, it is assumed that the coding of the blocks occurs in raster scan order (e.g., starting in the upper left corner and proceeding, one row at a time, from left to right). In other examples, the blocks can be coded in a different order, such as an up-and-down order, a spiral order, or another order.

The current block 402 is a block of data representing a set of pixels in the video frame. The current block 402 can represent, for example, a rectangular are of pixels that is 16 pixels wide by 16 pixels high, or another number of pixels in size. In an encoding process, the current block 402 includes actual pixel values, such as luma and chroma values for the pixels. In a decoding process, the current block 402 includes parameters that describe how the pixels values in the current block 402 can be reconstructed.

Coding of the current block 402 can include matching the current block 402 against the blocks in the reference window 406 to find a reference block 404 that most closely matches the current block 402. Spatial similarity between the current frame 410 and the reference frame 412 is assumed. Thus, the reference window 406 can be an area of pixels centered around the location of the current block 402 (as mapped to the reference frame 412). In some examples, a coding device matches the current block 402 against blocks in the reference window 406 in raster scan order. In some examples, the coding device matches the current block 402 against blocks in the reference window 406 in an outward spiraling order, starting with the center block in the reference window 406. As noted above, the coding device can identify the best-matching reference blocks in the reference window 406 by determining a difference (e.g., in pixel values) between the current block 402 and a reference block and finding the reference block with the smallest difference.

Once the coding device has identified the best matching reference block 404, the current block 402 can be coded. To encode the current block 402, in some examples, the differences between the current block 402 and the reference block 404 (referred to as the residual) can be encoded, along with a motion vector 408 that indicates the difference in location between the current block 402 and the reference block 404. In decoding, the motion vector 408 can be used to locate the reference block 404 in the reference frame 412. The reference block 404 can then be used to reconstruct the current block 402, for example by adding the residuals to the reference block 404.

A coding device may try different inter-prediction modes on the current block 402 in order to find the best match in the reference frame 412. The different prediction modes can partition the current block 402 into different, not necessarily equal-sized, sub-blocks. The coding device can then match each sub-block to sub-blocks of similar size a reference window from the reference frame 412. Larger blocks can be easier to match when the contents are fairly uniform. Larger blocks can also encode a large area of a video frame into a small amount of data. Small sub-blocks may produce better matches when the block includes a large amount of detail. Small sub-blocks can thus better reconstruct a detailed area of the video frame. Each sub-block may be individually encoded, however, and thus small sub-blocks may encode into a larger amount of data.

As discussed above, the reference frame 412 may be stored in a memory external to a coding device, in which case the coding device would read the reference window 406 from the external memory when performing prediction. Each inter-prediction mode may use a reference window of a different size. In some cases, each reference window may be in a slightly different location in the reference frame 412. In some examples, the coding device may read a reference frame for each inter-prediction mode applied to the current block 402. As noted above, however, there may be insufficient memory bandwidth for the coding device to reading all possible reference windows from the external memory. When obtaining the best compression is the objective of the coding device, it may be acceptable for the coding device to wait until sufficient bandwidth is available to read the reference windows. When maintaining an output data rate is the objective of the coding device, the coding device can implement various techniques to avoid waiting for available bandwidth.

One example technique is for the coding device to enable inter-prediction modes for which reference windows can be obtained with the available bandwidth. Examples of different reference window sizes and the amount of bandwidth that may be needed to read the reference windows is illustrated in Table 1 above. As an example, the coding device (for example, using the control circuit discussed with respect to FIG. 3) can start with the inter-prediction mode whose reference window requires the largest amount of bandwidth, and proceed to modes with successively smaller bandwidth needs until a reference window size is found that can be read using available bandwidth. Using the data from Table 1 as an example, the coding device may determine that the reference windows for the P4×4, the P4×8, and the P8×4 modes require more bandwidth than is available, but that reference window for the P8×8 mode can be read using the available bandwidth. In this example, if any bandwidth remains after reading the reference window for the P8×8 mode, the coding device can proceed with any other mode for which the reference data can be read.

In addition to enabling inter-prediction modes based on whether the reference frames can be read from external memory, the coding device can implement other techniques (as discussed further below), such as combining reference windows and sharing reference windows between inter-prediction modes.

Figure 5:
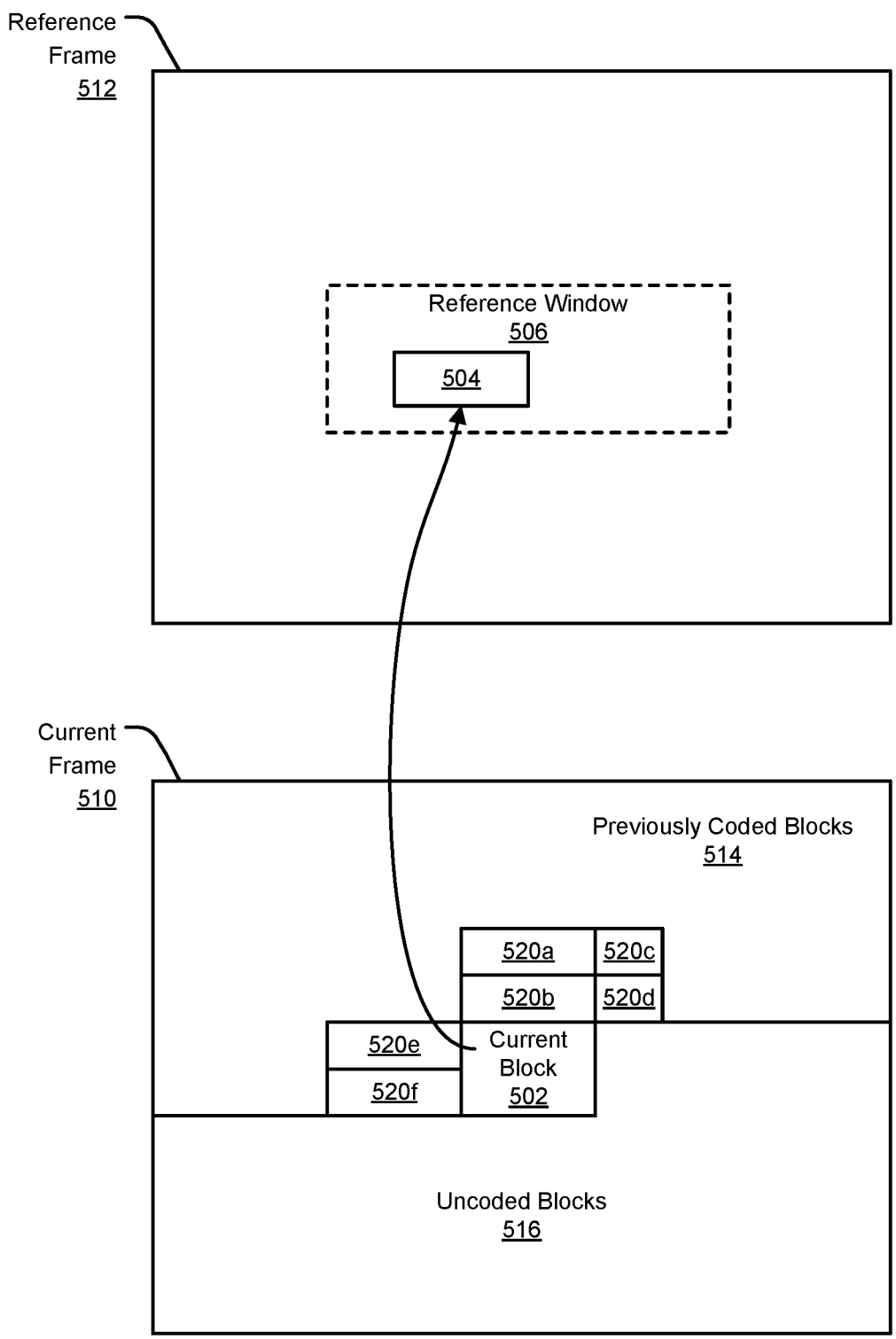
FIG. 5 includes a block diagram illustrating other techniques a coding device can use to determine inter-prediction modes to apply to a current block and/or reference frames that can be obtained to perform inter-prediction on the current block.

FIG. 5 includes a block diagram illustrating other techniques a coding device can use to determine inter-prediction modes to apply to a current block 502 and/or reference frames that can be obtained to perform inter-prediction on the current block 502. The techniques illustrated by FIG. 5 can be implemented, for example, by the controller circuit illustrated in FIG. 3.

In the example of FIG. 5, the current frame 510 is a video frame that is in the process of being encoded or decoded. The current frame 510 includes a number of previously coded blocks 514 (e.g., blocks that have already been processed and encoded or decoded) and a number of uncoded blocks 516 (e.g., blocks that have not yet been processed). The reference frame 512 is a temporally different frame from the current frame 510, and may precede or follow the current frame 510 in display order. The reference frame 512 is a reconstructed frame and, as such, includes a full set of values for each pixel location. The reference frame 512 can be stored in a memory that is external to a coding device that is coding the current frame 510.

The current block 502 is a rectangular region of pixels that the coding device is in the process of coding. In the example of FIG. 5, the coding device is performing inter-prediction on the current block 502, but is not able to obtain reference windows from the reference frame 512 for all possible inter-prediction modes, due to lack of bandwidth to the external memory.

In various examples, the coding circuit may thus selectively enable inter-prediction modes, using the encoding parameters of neighbor blocks 520a-520f to determine which prediction modes to enable. In some cases, the neighbor blocks 520a-520f of the current block 502 may be spatially correlated, meaning that the neighbor blocks 520a-520f and the current block 502 may have similar content. Thus, in these cases, it is likely, though not certain, that the best inter-prediction mode for the current block 502 is the prediction mode used to predict the neighbor blocks 520a-520f. The prediction mode used to predict each of the neighbor blocks 520a-520f can be indicated by the encoding parameters for each block. The encoding parameters can also indicate information such as a reference block and a motion vector for each of the neighbor blocks 520a-520f. In some examples, neighbor blocks 520a-520f may be present in the local memory of the coding device, in which case the coding device can read the encoding parameters of these blocks from the local memory. In some examples, the coding device may separately store the encoding parameters of the neighbor blocks 520a-520f for purposes of selecting inter-prediction modes.

In some examples, the coding device can assign priorities to inter-prediction modes based on the prediction modes of the neighbor blocks 520a-520f. For example, the coding device can examine a neighbor block in the up direction (e.g., a block 520b), and give a higher priority to the inter-prediction mode used to predict this block. As another example, the coding device can examine a neighbor block to the left (e.g., a block 520e), and give a higher priority to the inter-prediction mode used to predict this block. As another example, the coding device can conduct a survey of the neighbor blocks 520a-520f, and prioritize the inter-prediction modes based on the survey. For example, in the example illustrated in FIG. 5, four of the neighbor blocks 520a-520f of the current block 502 were predicted using a half-size partition, while two were predicted using a quarter-size partition. In this example, the inter-prediction mode for the half-size partition can be given the highest priority and the inter-prediction mode for the quarter-size partition may be given a next-highest priority.

Once the coding device has assigned priorities to the inter-prediction modes, the coding device can then enable the inter-prediction modes in the order of the priorities. In the example of FIG. 5, the coding device may try half-sizes sub-blocks first. In this example, the current block 502 can be partitioned into half-size sub-blocks, and a reference window 506 for the first of the half-size blocks can be read from the external memory. The reference window 506 can then be searched for a reference block 504 for each of the half-size sub-blocks.

Available bandwidth is also considered. When, for example, the highest-priority inter-prediction mode requires reading a reference frame that is larger than an amount that can be read using the available bandwidth, the coding device may disable the highest-priority inter-prediction mode, and instead go with the next-highest priority inter-prediction mode. In this example, the next-highest priority inter-prediction mode may also require a reference frame that is too large for the available bandwidth, in which the coding device can go with the next-highest priority inter-prediction mode.

The example of FIG. 5 illustrates use of the encoding parameters of the next nearest neighbors to determine which inter-prediction modes to enable. In other examples, the coding device can also include neighbor blocks that are one, two, three, or some other number of blocks away. In these examples, the coding device may have more information upon which to base the priorities assigned to the inter-prediction modes.

In some cases, the encoding parameters of neighboring blocks may not be available, or may not be helpful in prioritizing inter-prediction modes. The encoding parameters of neighboring blocks are not available when, for example, a block is located along the left edge of the current frame 510 (up neighbors may be available) or when a block is located along the top edge of the current frame 510 (left neighbors may be available. When neighboring blocks were encoded using an intra-prediction mode, then the encoding parameters of the neighboring blocks may not provide information that can be used to prioritize inter-prediction modes. In these and other cases, the coding device can instead enable inter-prediction modes based on the sizes of the reference windows and whether the reference windows can be obtained from memory (such as is described above with respect to FIG. 4) and/or can employ other techniques, such as sharing or combining reference windows, as discussed further below.

Figure 6:
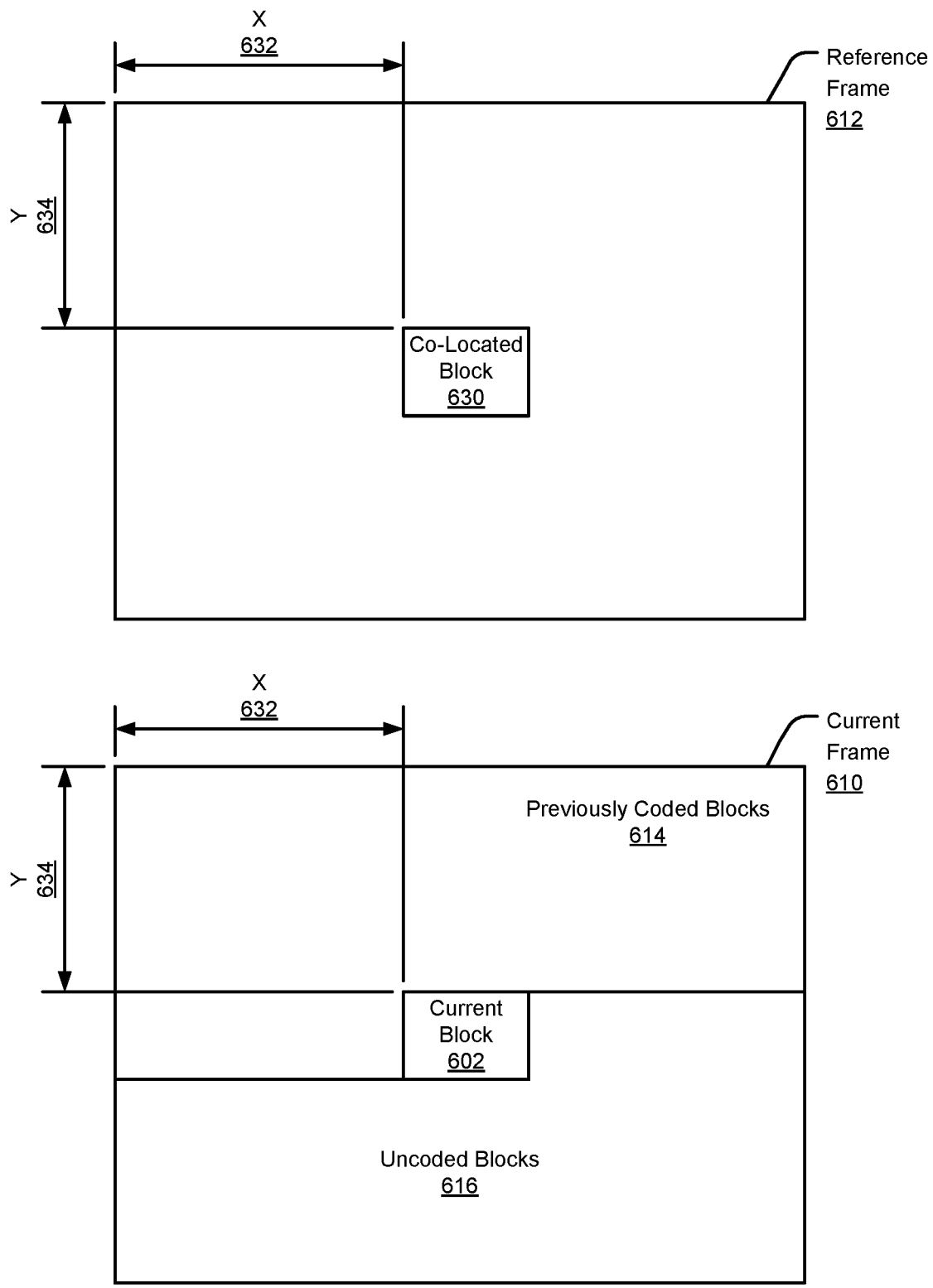
FIG. 6 includes a block diagram illustrating other techniques a coding device can use to determine inter-prediction modes to apply to a current block and/or reference frames that can be obtained to perform inter-prediction on the current block.

FIG. 6 includes a block diagram illustrating other techniques a coding device can use to determine inter-prediction modes to apply to a current block 602 and/or reference frames that can be obtained to perform inter-prediction on the current block 602. The techniques illustrated by FIG. 6 can be implemented, for example, by the controller circuit illustrated in FIG. 3.

In the example of FIG. 6, the current frame 610 is a video frame that is in the process of being encoded or decoded. The current frame 610 includes a number of previously coded blocks 614 (e.g., blocks that have already been processed and encoded or decoded) and a number of uncoded blocks 616 (e.g., blocks that have not yet been processed). The reference frame 612 is a temporally different frame from the current frame 610, and may precede or follow the current frame 610 in display order. The reference frame 612 is a reconstructed frame and, as such, includes a full set of values for each pixel location. The reference frame 612 can be stored in a memory that is external to a coding device that is coding the current frame 610.

The current block 602 is a rectangular region of pixels that the coding device is in the process of coding. In the example of FIG. 6, the coding device is performing inter-prediction on the current block 602, but is not able to obtain reference windows from the reference frame 612 for all possible inter-prediction modes, due to lack of bandwidth to the external memory.

In various examples, the coding circuit may thus selectively enable inter-prediction modes using the encoding parameters of a co-located block 630 to the current block 602. The co-located block 630 is a block from the reference frame 612 that is located in a same location in the reference frame 612 as is the current block 602 in the current frame 610. The location of the current block 602 within the current frame 610 can be determined from a horizontal dimension 632 and a vertical dimension 634, which may be in units of pixels. In some examples, the horizontal dimension 632 and the vertical dimension 634 indicate the location of the top-left pixel of the current block 602. In some examples, the horizontal dimension 632 and the vertical dimension 634 can indicate another part of the current block 602, such as the top right, the bottom left, the bottom right, or the center pixel of the current block 602.

The co-located block 630 has the same horizontal dimension 632 and vertical dimension 634 as does the current block 602. By virtue of being in the reference frame 612, the co-located block 630 has already been coded, and, as such, the encoding parameters of the co-located block 630 are available.

Due to spatial correlation, the co-located block 630 may have similar content as does the current block 602. For this reason, it may be that a prediction mode used to predict the co-located block 630 may be the best prediction mode to use for the current block 602. When the prediction mode used to predict the co-located block 630 was an inter-prediction mode, the coding device can assign a higher priority to this prediction mode. When determining which inter-prediction modes to try on the current block 602, the coding device can consider priorities, as well as other factors, such as whether sufficient bandwidth is available to read a reference window associated with each inter-predication mode.

In various examples, the coding device can also consider other factors when determining which inter-prediction modes to enable. For example, the coding device can also consider the encoding parameters of blocks neighboring the co-located block 630. In this example, the prediction mode used to predict these blocks can also be given a higher priority. As another example, the coding device can consider the encoding parameters of blocks neighboring the current block 602 in the current frame 610, as discussed above. The coding device further use other techniques, such as combining reference windows or sharing reference windows.

Figure 7:
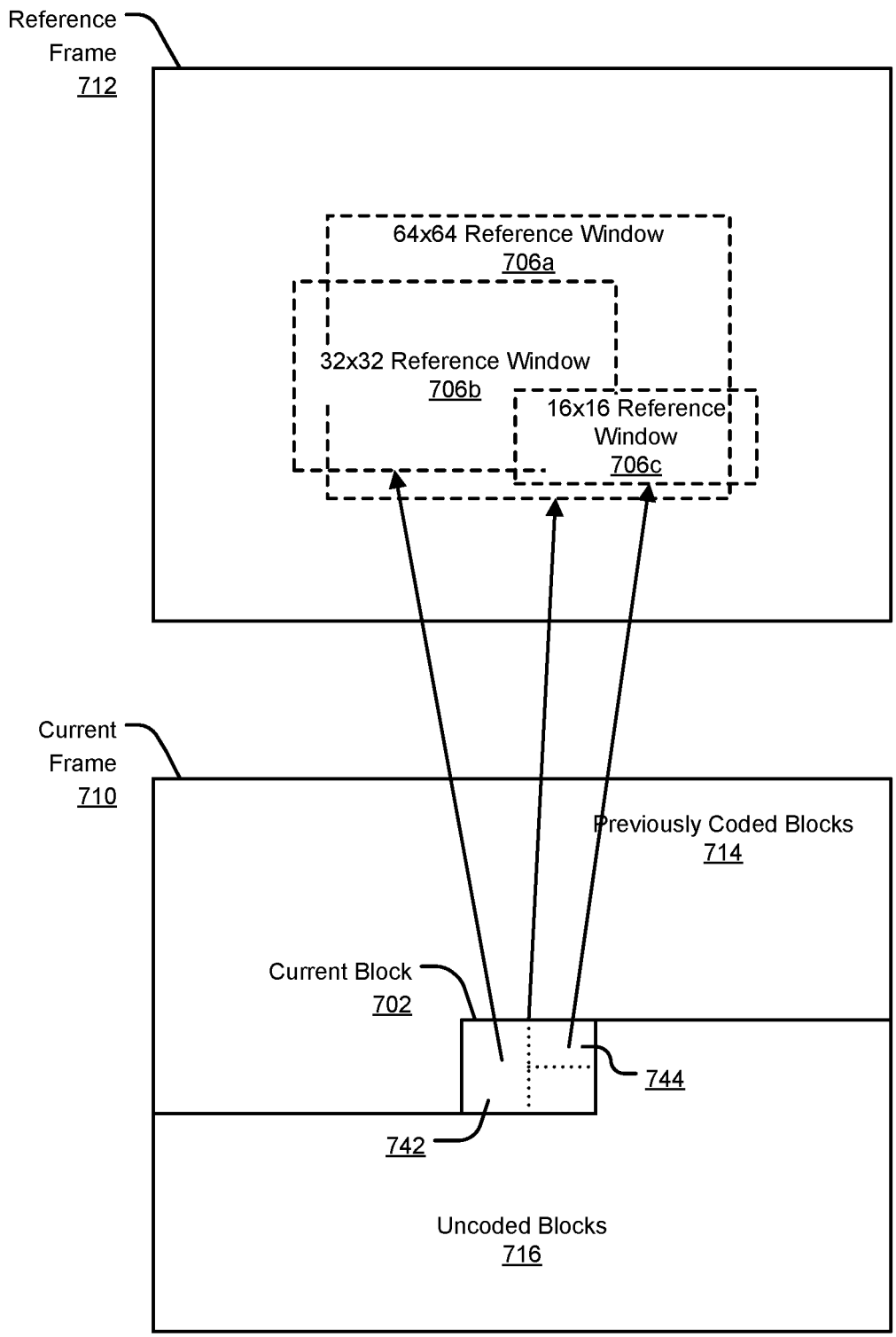
FIG. 7 includes a block diagram illustrating other techniques a coding device can use to determine inter-prediction modes to apply to a current block and/or reference frames that can be obtained to perform inter-prediction on the current block.

FIG. 7 includes a block diagram illustrating other techniques a coding device can use to determine inter-prediction modes to apply to a current block 702 and/or reference frames that can be obtained to perform inter-prediction on the current block 702. The techniques illustrated by FIG. 7 can be implemented, for example, by the controller circuit illustrated in FIG. 3.

In the example of FIG. 7, the current frame 710 is a video frame that is in the process of being encoded or decoded. The current frame 710 includes a number of previously coded blocks 714 (e.g., blocks that have already been processed and encoded or decoded) and a number of uncoded blocks 716 (e.g., blocks that have not yet been processed). The reference frame 712 is a temporally different frame from the current frame 710, and may precede or follow the current frame 710 in display order. The reference frame 712 is a reconstructed frame and, as such, includes a full set of values for each pixel location. The reference frame 712 can be stored in a memory that is external to a coding device that is coding the current frame 710.

The current block 702 is a rectangular region of pixels that the coding device is in the process of coding. In the example of FIG. 7, the coding device is performing inter-prediction on the current block 702, but is not able to obtain reference windows from the reference frame 712 for all possible inter-prediction modes, due to lack of bandwidth to the external memory.

In various examples, the coding device may thus combine reference windows for different inter-prediction modes, to reduce the amount of reference data that the coding device reads from external memory. As noted previously, different reference windows for different inter-prediction modes may differ in size and/or location. In some cases, however, the reference windows for different inter-prediction modes may overlap, such that one reference window can be used by more than one inter-prediction mode.

FIG. 7 illustrates examples of different reference windows 706a-706c that correspond to different inter-prediction modes that can be applied to the current block 702. The first reference window 706a would be used with an inter-prediction mode that does not partition the current block 702. The second reference window 706b would be used with an inter-prediction mode that partitions the current block 702 into a half-size partition 742. The third reference window 706c would be used with an inter-prediction mode that partitions the current block 702 into a quarter-size partition 744.

As illustrated by this example, the reference windows 706a-706c, while differing in size, may include an overlapping area of the reference frame 712. When the bandwidth is available to read the largest reference frame, which is the first reference window 706a, from external memory, then the coding device may be able to use this reference frame to perform all three inter-prediction modes. For example, the coding device can identify the portion of the second reference window 706b that is included in the first reference window 706a, and use this portion to perform inter-prediction for the half-size partition 742. Alternatively or additionally, the coding device can use all of the first reference window 706a to perform inter-prediction for the half-size partition 742. In this example, a portion of the second reference window 706b may be outside of the first reference window 706a and thus not be included in the inter-prediction of the half-size partition 742, which has been determined to be an acceptable trade-off to reduce bandwidth usage. As a further example, the coding device can also identify a portion of the third reference window 706c that is included in the first reference window 706a, and use this portion to perform inter-prediction for the quarter-size partition 744, or the coding device can use all of the first reference window 706a to perform inter-prediction for the quarter-size partition 744. In this example, any part of the third reference window 706c that is outside the first reference window 706a is excluded from the inter-prediction for the quarter-size partition 744.

In some examples, only enough bandwidth to read the second reference window 706b may be available, such that the first reference window 706a should not be read. In this case, the coding device may determine to use the second reference window 706b to perform the inter-prediction mode for the unpartitioned current block 702, as well as the half-size partition 742. The search area for this prediction mode is reduced, however, the prediction mode can be performed, instead of having to be disabled.

In some examples, the coding device can, alternatively or additionally, determine to use the second reference window 706b to perform the inter-prediction mode for the quarter-size partition 744 as well. Doing so can avoid the coding device having to read the third reference window 706c. The quarter-size inter-prediction mode may use the larger search area provided by the second reference window 706b. Alternatively, the coding device can constrain the search to the area of the second reference window 706b that would be part of the third reference window 706c.

In some examples, in addition to or instead of reading one or more of the reference windows 706a-706c based on which can be read using available bandwidth, the coding device can also consider the encoding parameters of blocks neighboring the current block 702 when determining which reference frames can be read. For example, the coding device may give higher priority to inter-prediction modes that were used to predict the neighboring blocks, so that, if the bandwidth is available for these prediction modes, the reference windows for these prediction modes will be read first. In this example, an inter-prediction mode for which there is not sufficient bandwidth to read a reference frame can be made to use the reference from of an inter-prediction mode for which a reference frame could be read. In some examples, the reference frame that is used is the reference frame from the lowest-priority (as determined by the prediction modes of the neighboring blocks) inter-prediction mode for which a reference frame could be read. In some examples, the priorities can, alternatively or additionally, be based on a co-located block in the reference frame.

Figure 8:
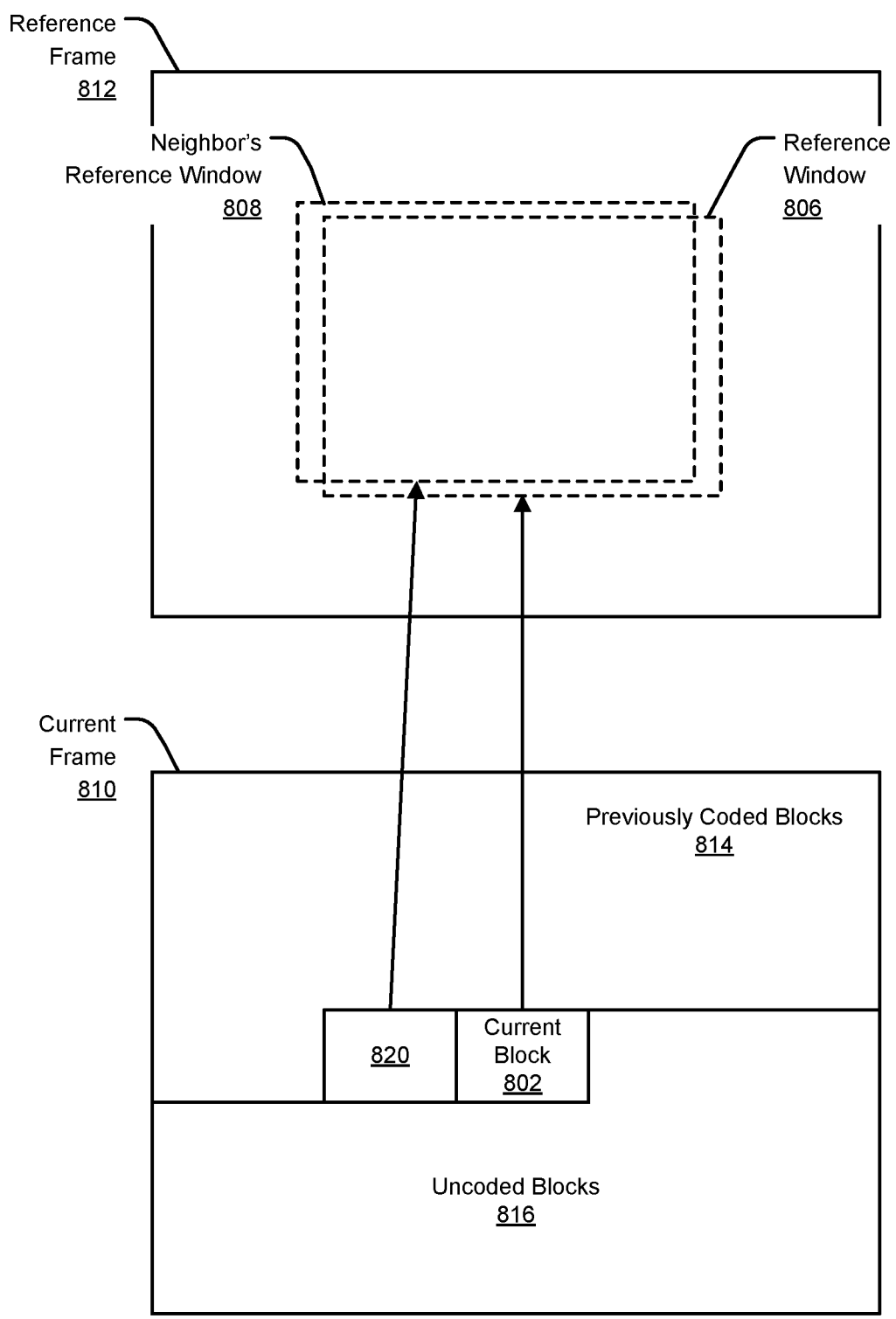
FIG. 8 includes a block diagram illustrating other techniques a coding device can use to determine inter-prediction modes to apply to a current block and/or reference frames that can be obtained to perform inter-prediction on the current block.

FIG. 8 includes a block diagram illustrating other techniques a coding device can use to determine inter-prediction modes to apply to a current block 802 and/or reference frames that can be obtained to perform inter-prediction on the current block 802. The techniques illustrated by FIG. 8 can be implemented, for example, by the controller circuit illustrated in FIG. 3.

In the example of FIG. 8, the current frame 810 is a video frame that is in the process of being encoded or decoded. The current frame 810 includes a number of previously coded blocks 814 (e.g., blocks that have already been processed and encoded or decoded) and a number of uncoded blocks 816 (e.g., blocks that have not yet been processed). The reference frame 812 is a temporally different frame from the current frame 810, and may precede or follow the current frame 810 in display order. The reference frame 812 is a reconstructed frame and, as such, includes a full set of values for each pixel location. The reference frame 812 can be stored in a memory that is external to a coding device that is coding the current frame 810.

The current block 802 is a rectangular region of pixels that the coding device is in the process of coding. In the example of FIG. 8, the coding device is performing inter-prediction on the current block 802, but is not able to obtain reference windows from the reference frame 812 for all possible inter-prediction modes, due to lack of bandwidth to the external memory.

In various examples, the coding device may thus determine to reuse a reference window between two or more blocks. For example, when the left neighbor block 820 of the block 802 was coded, the coding device may have determined to use a particular inter-prediction mode, and had enough bandwidth to read the reference window (referred to here as the neighbor's reference window 808) for the particular inter-prediction mode. When the coding device next codes the current block 802, the coding device may not have enough bandwidth to load the reference window 806 for the same inter-prediction mode. In this case, the coding circuit may determine to use the neighbor's reference window 808 instead. The neighbor's reference window 808 may, for example, still be in the coding device's local memory, so that the coding device does not need to read any reference data. The coding device may decide to use the neighbor's reference window 808 when the neighbor's reference window 808 is approximately the same size as the reference window 806 that the coding device would otherwise use. Alternatively or additionally, the coding device may choose to use the neighbor's reference window 808 when a predicted motion vector for the current block 802 falls within the neighbor's reference window 808 (a predicted motion vector is a speculative motion vector that is based on the motion vector of the neighboring blocks). The bandwidth that is not used to read the reference window 806 for the current block 802 can possibly be used to read other reference windows for performing other inter-prediction modes on the current block 802.

Figure 9:
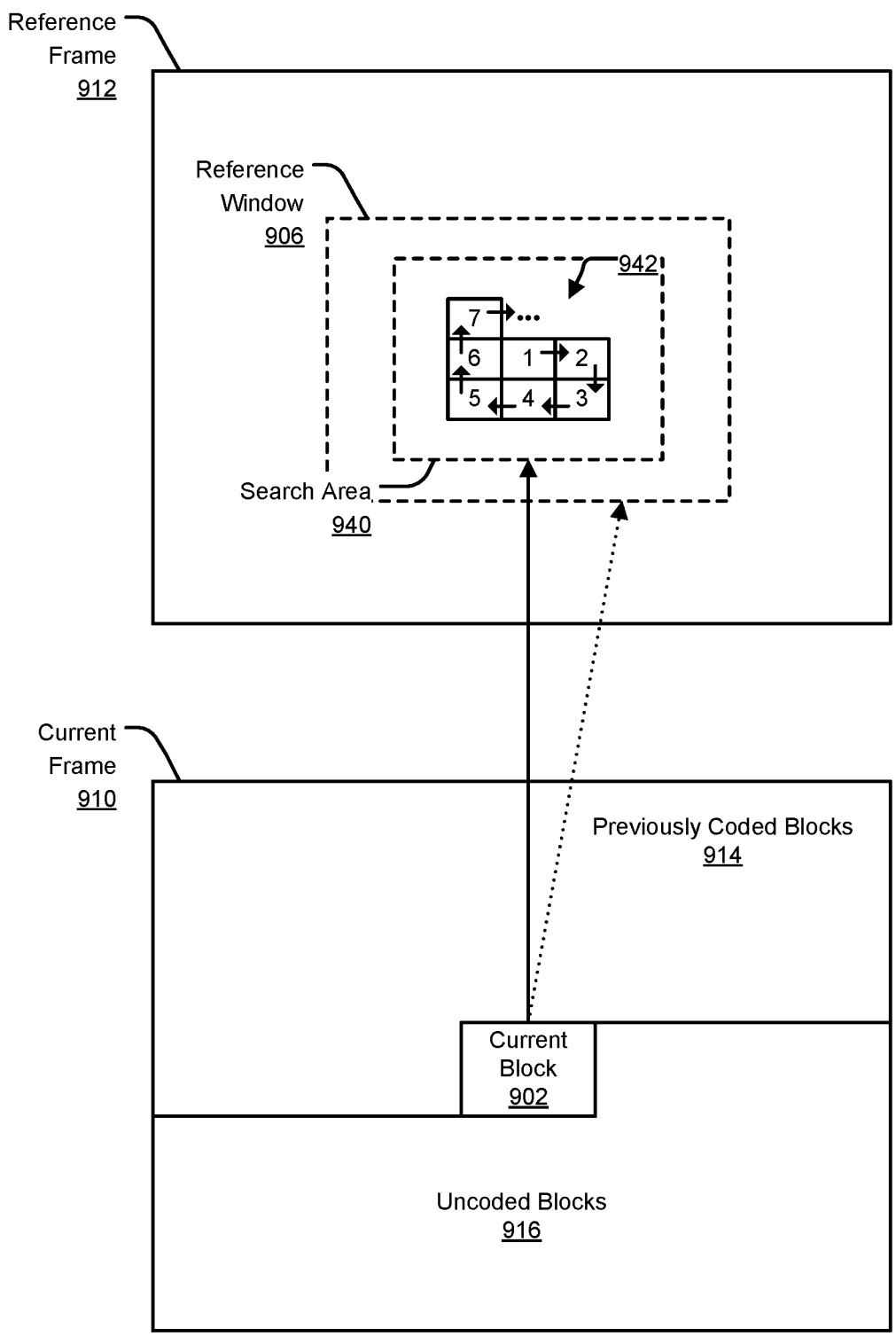
FIG. 9 includes a block diagram illustrating other techniques a coding device can use to determine inter-prediction modes to apply to a current block and/or reference frames that can be obtained to perform inter-prediction on the current block.

FIG. 9 includes a block diagram illustrating other techniques a coding device can use to determine inter-prediction modes to apply to a current block 902 and/or reference frames that can be obtained to perform inter-prediction on the current block 902. The techniques illustrated by FIG. 9 can be implemented, for example, by the controller circuit illustrated in FIG. 3.

In the example of FIG. 9, the current frame 910 is a video frame that is in the process of being encoded or decoded. The current frame 910 includes a number of previously coded blocks 914 (e.g., blocks that have already been processed and encoded or decoded) and a number of uncoded blocks 916 (e.g., blocks that have not yet been processed). The reference frame 912 is a temporally different frame from the current frame 910, and may precede or follow the current frame 910 in display order. The reference frame 912 is a reconstructed frame and, as such, includes a full set of values for each pixel location. The reference frame 912 can be stored in a memory that is external to a coding device that is coding the current frame 910.

The current block 902 is a rectangular region of pixels that the coding device is in the process of coding. In the example of FIG. 9, the coding device is performing inter-prediction on the current block 902, but is not able to obtain reference windows from the reference frame 912 for all possible inter-prediction modes, due to lack of bandwidth to the external memory.

In various examples, the coding device can reduce the amount of reference data that the coding device reads for performing a particular inter-prediction mode, so that the inter-prediction mode can be performed without needing to wait for there to be enough bandwidth to read the reference data. For example, the coding device can determine a search area 940 in which to search for a reference block that matches the current block 902. In this example, the size of the search area 940 can be based on the amount of bandwidth that is available to read reference data. The coding device can then reduce the size of the reference window 906 to the size of the search area, and then may be able to read the reference window 906 from external memory.

As another example, the coding device can determine a reduced number of search iterations 942. On each search iteration, the coding device tests the current block 902 against a different block in the reference window 906. In various examples, the coding device can match the current block 902 in a particular pattern. In the example of FIG. 9, an inside-to-outside spiral pattern is illustrated. Spiral pattern can begin in a first position, in the center of the reference window 906, proceed to the right to a second position, then down to a third position, then left to a fourth position, then left to a fifth position, then up to a sixth position, then up to a seventh position, and so on until each block in the reference window 906 has been checked. In other examples, the coding device can use other patterns, such as a raster-scan order or and up and down order, among other examples.

In various examples, the coding device can reduce the number of search iterations 942 to a number that is less than would be needed to search all of the reference window 906. For example, the coding device can determine to perform four out of a total of twelve search iterations. In this and other examples, the coding device can next determine the size of the search area 940 that results from the reduced number of search iterations. The coding device can further reduce the size of the reference window 906 to the size of the search area 940, and can read the reference window 906 if there is sufficient bandwidth to do so.

Figure 10:
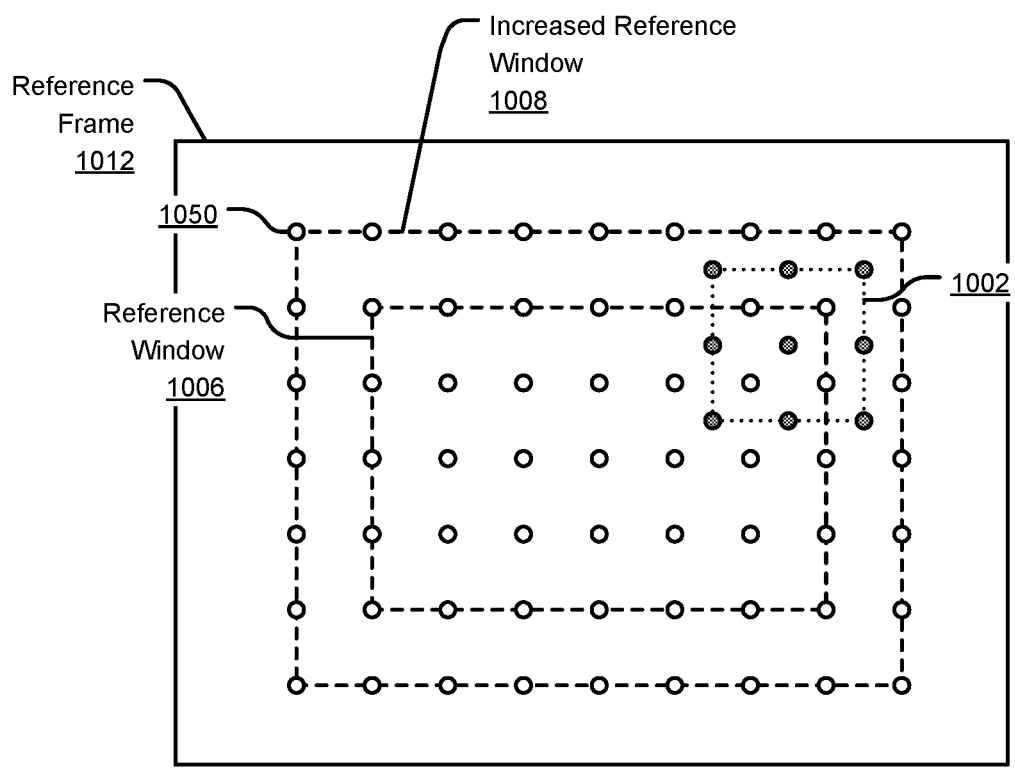
FIG. 10 includes a block diagram illustrating an example of a sub-pixel search.

FIG. 10 includes a block diagram illustrating an example of a sub-pixel search, and an increased reference window 1008 that can result from a sub-pixel search. In searching a reference window 1006, a coding device can compare the pixels in a current block 1002 against blocks of pixels in the reference window 1006. Doing so can result in a motion vector that has only integer components, with the components indicating a number of horizontal and vertical pixel positions 1050 between the location of the current block 1002 and the reference block. Full pixel positions 1050 are illustrated in FIG. 10 using unshaded dots.

In some examples, the coding device can be configured to perform sub-pixels searches, in which the current block 1002 is matched at, for example, half pixel, quarter pixel, one eight pixel, or another fractional pixel location. To perform a match at a sub-pixel position, the coding device can interpolate pixel values from nearby pixels. A sub-pixel search can result in one or both components of a motion vector being a fractional value. A set of sub-pixel positions for one possible search location is illustrated in FIG. 10 using shaded dots.

Using sub-pixel searches can result in the coding device having to read a larger reference window (referred to here as an increased reference window 1008) than would be the case if only pixel positions 1050 were used in the search. For example, the reference window 1006 may need to be increased by one pixel position in all directions so that the coding device has enough pixels to perform interpolation at the edges of the reference window 1006. In some cases, the increased reference window 1008 may be larger than the coding device can read with the available bandwidth. When this is the case, in various examples, the coding device may determine to disable one or more sub-pixel searches. Disabling sub-pixel searches can result in the coding device find a less than optimal match in the reference window 1006, but doing so can avoid a delay that may result in attempting to fetch the increased reference window 1008.

In some examples, the system that includes the coding device can generate, for a given video frame, a sub-pixel-interpolated version of the frame. In this alternate version of the frame, each, for example, half-pixel position can be interpolated, such that the alternative version of the frame (which may be referred to as a sub-pixel plane) includes an interpolation for each half-pixel position. Additional versions of the frame for quarter-pixel, one-eighth-pixel, and other fractional pixel locations can also be generated. The generation of these sub-pixel-interpolated video frames can be performed, for example, by a host processor in the system, or by another processor.

When sub-pixel-interpolated versions of a video frame are available, in some examples, sub-pixel searches need not be disabled when the current bandwidth available to the coding device is not enough to load the increased reference window 1008 that would be needed to perform the interpolation. Instead, the coding device can load a reference window from one or more the sub-pixel-interpolated versions of the video frame. The reference window that is read from a sub-pixel interpolated version of the video frame can be the same size as the reference window 1006 that would be loaded when sub-pixel searching is disabled, because additional pixels outside of this reference window 1006 are not needed for performing interpolation.

Whether more than one sub-pixel search is conducted can depend on the available bandwidth. For example, the coding device may have access to sufficient bandwidth to load two reference frames, and thus may be able to perform a half-pixel and a quarter pixel search. In this example, additional bandwidth may not be available, in which case the coding device can determine to not perform a one-eighth-pixel search.

FIG. 11 includes a flowchart illustrating an example of a process 1100 for coding video data. The example process 1100 can be implemented by an integrated circuit device, such as the integrated circuit devices discussed with respect to FIGS. 1-3.

At step 1102, the process 1100 of FIG. 11 includes determining a particular amount of bandwidth that is available for obtaining reference data from an external memory, wherein a fixed amount of bandwidth is available to the integrated circuit device for obtaining data from the external memory, and wherein the particular amount of bandwidth is determined at a particular point in time.

In some examples, the integrated circuit device can include a bandwidth determination circuit for determining the particular amount of bandwidth. In these examples, the bandwidth determination circuit can determine the amount of bandwidth that is available based on coding of previous blocks of the video data. For example, the amount of bandwidth that is available can be based on whether previous blocks were coded using intra-prediction modes or inter-prediction modes, a partition size used to predict the previous blocks, and/or other factors. Alternatively or additionally, the bandwidth determination circuit can determine the amount of bandwidth that is available based on a number of transactions previously sent to the memory and the sizes of the transactions. For example, the particular amount of bandwidth that is available can be based on the number and size of previously sent transactions, and an expected completion time for these transactions.

At step 1104, the process 1100 includes selecting an inter-prediction mode from a plurality of inter-prediction modes, wherein the inter-prediction mode is selected based on a size of a reference window associated with the inter-prediction mode, the size being within an amount of data that can be read from the external memory using the particular amount of the bandwidth available at the particular point in time. In various examples, the inter-prediction mode used by the integrated circuit determines a sizes of a reference window used to perform the inter-prediction.

In some examples, the process 1100 further includes determining, for a second inter-prediction mode from the plurality of inter-prediction modes, a second size of a second reference window associated with the second inter-prediction mode. In these examples, the process 1100 further includes determining that the second size is larger than the amount of data that can be read from the external memory using the particular amount of the bandwidth. In this case, the process 1100 can include removing the second inter-prediction mode from consideration in selecting the inter-prediction mode.

In some examples, the inter-prediction mode is selected based on one or more prediction modes used to predict one or more neighboring blocks of the block of the video data. For example, the process 1100 can include determining a prediction mode used to predict a neighbor block of the block of the video data. In this example, the inter-prediction mode selection circuit selects the inter-prediction mode based on the prediction mode used to predict the neighbor block. As another example, the process 1100 can include determining a reference frame for performing prediction for the block of the video data, and determining a prediction mode used to predict a second block of the video data, the second block of the video data being from the reference frame, where the second block of the video data is in a same location in the reference frame as is the block of the video data in the current frame. In this example, the process 1100 includes selecting the inter-prediction mode based on the prediction mode used to predict the second block of the video data.

In some examples, the process 1100 includes determining that each previously coded neighbor block of the block of the video data was predicted using an intra-prediction mode. In these examples, the process 1100 can select the inter-prediction mode based on the size of the reference window.

In some examples, the process 1100 further includes determining a search area size, the search area size being within the amount of data that can be read from the external memory using the particular amount of bandwidth. For example, the search area size can be within the amount of data that can be read from the external memory using the available amount of bandwidth. In this and other examples, the process 1100 further includes reducing the size of the reference window to the search area size before reading the reference frame from the external memory. The reduced-size reference window can further be used to select the inter-prediction mode.

In some examples, determining the search area size can include determining a number of times the motion estimation circuit is to search the reference window for a reference block matching the block of the video data, the number of times corresponding to a search area size. In these examples, the process 1100 further includes reducing the size of the reference window to the search area size before causing the reference window to be read from the external memory, the search area size being less than a maximum reference window size associated with the inter-prediction mode. The reduced-size reference window can further be used to select the inter-prediction mode.

In some examples, the process 1100 can further include determine an increase in the size of the reference window needed to perform a sub-pixel search. In these examples, the process 1100 can further include disabling the sub-pixel search based on the increase in the size of the reference window resulting in the size of the reference window being greater than the amount of data that can be read from the external memory using the particular amount of the bandwidth.

At step 1106, the process 1100 includes reading the reference window from the external memory.

At step 1108, the process 1100 includes performing prediction for the block of the video data using the inter-prediction mode and the reference window. In various examples, the block of the video data is from a current frame being coded by the integrated circuit device. In these examples, an inter-prediction mode uses a reference frame to perform prediction, where the reference frame is temporally before or after the current frame. In these examples, the reference window includes a portion of the reference frame.

In some examples, the process 1100 includes selecting a second inter-prediction mode from the plurality of inter-prediction modes. In these examples, the process 1100 can include determining that a second reference window associated with the second inter-prediction mode includes a portion of the reference window. The process 1100 can further include performing inter-prediction for the block of the video data using the second inter-prediction mode and the reference window.

In some examples, the block of the video data is associated with a video stream from a plurality of video streams being coded by the integrated circuit device. In these examples, a portion of the fixed amount of bandwidth is allocated to each of the plurality of video streams. In some examples, the particular amount of bandwidth is less than the fixed amount of bandwidth due to the multiple of the plurality of video streams being coded simultaneously. In some examples, the particular amount of bandwidth is less than the fixed amount of bandwidth due to a portion of the fixed amount of bandwidth having previously been used to read reference data from the external memory.

FIG. 12 includes a flowchart illustrating an example of a process 1200 for coding video data. The example process 1200 can be implemented by an integrated circuit device, such, for example, the integrated circuit devices discussed with respect to FIGS. 1-3.

At step 1202, the process 1200 includes determining a particular amount of bandwidth that is available for obtaining reference data from an external memory, wherein a fixed amount of bandwidth is available to the integrated circuit device for obtaining data from the external memory, and wherein the particular amount of bandwidth is determined at a particular point in time. In some examples, the integrated circuit device includes a bandwidth determination circuit. In these examples, the bandwidth determination circuit can determine the amount of the bandwidth that is available based on coding of previous blocks of the video data. Alternatively or additionally, the bandwidth determination circuit can determine the amount of the bandwidth that is available based on a number of transactions previously sent to the memory and the sizes of the transactions.

At step 1204, the process 1200 includes determining that the particular amount of bandwidth is insufficient for obtaining reference data for first inter-prediction mode of a plurality of inter-prediction modes. For example, the reference at may require 100 MB per second to be read from an external memory, but only 50 MB per second may be available.

At step 1206, the process 1200 includes determining, for a block of video data, a prediction mode used by a neighboring block. The prediction mode can be determined, for example, from encoding parameters for the neighboring block.

At step 1208, the process 1200 includes determining to use a second inter-prediction mode of the plurality of inter-prediction modes based on the encoding parameters of the neighboring block. For example, the process 1200 can include assigning a priority to third inter-prediction mode used to predict the neighboring block. In this example, the process 1200 can include determining to use the second inter-prediction mode based on the priority (e.g., the second inter-prediction mode can be the same as the third inter-prediction mode has the highest priority) and the particular amount of the bandwidth (e.g., the second inter-prediction mode may be other than the highest-priority inter-prediction mode when the highest-priority inter-prediction mode uses a reference frame that is too large read from external memory with the available bandwidth).

In some examples, the process 1200 can further include determining multiple encoding parameters of multiple neighboring blocks, the multiple neighboring blocks including the neighboring block. In these examples, determining to use the second inter-prediction mode can be based on prediction modes used for to predict each of the multiple neighboring blocks and the particular amount of bandwidth. For example, the process 1200 can include determining to use the second inter-prediction mode based on the second inter-prediction mode being used by a majority of the multiple neighboring blocks, or by the second inter-prediction mode being used by an average or median number of the neighboring blocks, or by the second inter-prediction mode being otherwise used by or related to the neighboring blocks. As a further example, the process 1200 can determine a weighted average of the inter-prediction modes used by the neighboring blocks, and selected the second inter-prediction mode based on the result of the weighted average.

At step 1210, the process 1200 includes obtaining a reference window for the second inter-prediction mode based on the encoding parameters of the neighboring block. The different inter-prediction modes can use differently-sized reference windows, such that the inter-prediction mode determines a size of the reference window. The reference window is from a reference frame, which is temporally before or after a current frame. The reference window includes a portion of the reference frame.

In various examples, the reference window obtained at step 1210 was used to predict the neighboring block. In these examples, the reference window is obtained from a local memory of the integrated circuit device. In some examples, the reference window is of a size that can be read using the particular amount of bandwidth. In these examples, the reference window can be obtained from the external memory.

In some examples, when the reference window is obtained from the external memory, the process 1200 can further include determine to use a third inter-prediction mode, the third inter-prediction mode having a lower priority than the second inter-prediction mode. In these examples, the process 1200 can include determining to use the reference window for performing prediction on the block of video data using the second inter-prediction mode, instead of reading a new reference frame from the external memory.

In some examples, the process 1200 can further include determining a reference frame for performing prediction for the block of video data, and determining second encoding parameters of a second block of video data, the second block of video data being in the reference frame. The second block of video data can be in a same location in the reference frame as is the block of video data in the current frame. In these examples, the process 1200 can include determining to use the second inter-prediction mode based on the second encoding parameters.

In some examples, the encoding parameters indicate that the neighboring block was predicted using an intra-prediction mode. In these examples, the process 1200, instead of using the prediction mode of the neighboring blocks to select the second inter-prediction mode, can select the inter-prediction mode based on a size of the reference window being within an amount of data that can be read from the external memory with the particular amount of the bandwidth. That is, the process 1200 can include determining a reference window size first, and then determining which inter-prediction mode or modes can use the reference window.

In some examples, the process 1200 can further include selecting as a reference frame the reference frame used for performing prediction on the neighboring block. In these examples, the reference window is obtained from the reference frame so selected.

At step 1212, the process 1200 includes performing prediction for the block of video data using the second inter-prediction mode and the reference window.

In various examples, the block of video data is associated with a video stream from a plurality of video streams being coded by the integrated circuit device. In these examples a portion of the fixed amount of bandwidth is allocated to each of the plurality of video streams. In some cases, the particular amount of bandwidth is less than the fixed amount of bandwidth due to the multiple of the plurality of video streams being coded simultaneously. In some cases, the particular amount of bandwidth is less than the fixed amount of bandwidth due to a portion of the fixed amount of bandwidth having previously been used to read reference data from the external memory.

Video compression techniques operate by removing spatial and temporal redundancy from video frames. Spatial redundancy occurs when a region of a video frame has a relatively homogenous appearance. For example, a wall appearing in a video frame may be fairly uniform in color and/or texture. Temporal redundancy occurs when portions of successive video frames are relatively unchanged. For example, a person's head may move only incrementally between one frame and the next, and thus pixels representing the person's head may be relatively similar in both frames. By removing different types of redundancy, video data can be compressed, possibly with the loss of some information.

Further compression can be achieved by encoding the processed data using an entropy coding scheme such as Huffman coding or Arithmetic coding. Various coding standards have been defined, including H.264 (also referred to as Advanced Video Coding (AVC)), H.265 (also referred to as High Efficiency Video Coding (HEVC)), and various standards defined by the Motion Pictures Experts Group (MPEG), such as MPEG-4 part 2, among other examples. As used herein, "coding" can refer to encoding, decoding, or both encoding and decoding.

A video data captures a scene in a sequence or series of video frames. In the digital realm, a video frame includes an array of pixels, which can also be referred to as samples or spatial samples. For example, a video frame can be 1920 pixels wide by 1080 pixels high, or 3840 pixels wide by 2160 pixels high, among other examples. Each pixel has a set of values that describe the color of the pixel. With monochrome images, only one number is required to indicate a brightness or luminance of each pixel. With color images, three numbers are used to represent a color. The method used to represent brightness (referred to as luminance or luma) and color is described as a color space. In the Red-Green-Blue (RGB) color space, the color of a pixel is represented with three numbers that indicate a relative proportion of red, green, and/or blue. The luma, chroma-blue, chroma-red (YCbCr, also referred to as YUV) color space separates the brightness or luminance of a pixel from the color components. The human visual system is less sensitive to color than to luminance, hence, in some examples, video frames can be captured more compactly using YCbCr by capturing a set of chroma values for a group of multiple pixels.

Encoding of a video frame produces a coded frame, which can also be referred to as a coded picture. A coded frame has a frame number that can be included in the output bitstream, and which is not necessarily related to the decoding order of the frames in the bitstream. Each coded frame is also associated with a picture order count, which defined the decoding order of the frames. Previously coded pictures, referred to as reference pictures, may be used for inter-prediction of further coded pictures. Reference pictures can be organized into one or two lists, referred to as list 0 and list 1.

A coded picture includes a number of macroblocks, where macroblock includes a certain number of luma samples from a frame and associated chroma samples. For example, a macroblock can include 16 by 16 luma samples and the 8 by 8 chroma-blue (Cb) and 8 by 8 chroma-red (Cr) samples associated with the luma samples in the macroblock. Within a coded picture, macroblocks can be arranged in slices, where a slice includes a contiguous, though not necessarily sequential, set of macroblocks. An I-slice contains only I-type macroblocks, a P-slice can contain P and I macroblocks, and a B-slice can contain B and I macroblocks.

I macroblocks are predicted using intra-prediction, where the intra-prediction is performed using decoded samples in the current slice. Prediction may be performed for the complete macroblock, or for each 4×4 block of luma samples and associated chroma samples in the macroblock. A coding standard may define other intra-prediction modes.

P macroblocks are predicted using inter-prediction, where the one or more reference pictures are used to perform the inter-prediction. An inter-coded macroblock may be divided into macroblock partitions. For example, one macroblock can be divided into partitions of 16×16, 16×8, 8×16, or 8×8 luma samples and associated chroma samples. Macroblock partitions can be further divided into sub-macroblock partitions. For example, an 8×8 partition can be divided into sub-macroblock partitions of 8×8, 8×4, 4×8, or 4×4 luma samples and associated chroma samples. In various examples, each macroblock partition may be predicted from one reference picture in list 0. If present, the sub-macroblock partitions in a sub-macroblock can be predicted using the same picture in list 0.

B macroblocks are predicted using inter-prediction, where one or more reference frames are used to perform the inter-prediction. The reference frames can come from list 0 and/or list 1. When present, sub-macroblock partitions in a sub-macroblock can be predicted from the same one or two reference pictures.

In inter-prediction coding, the term "block" may be used to denote a macroblock partition or a sub-macroblock partition. In intra-coding, block may refer to a macroblock or a sub-macroblock.

Figure 13:
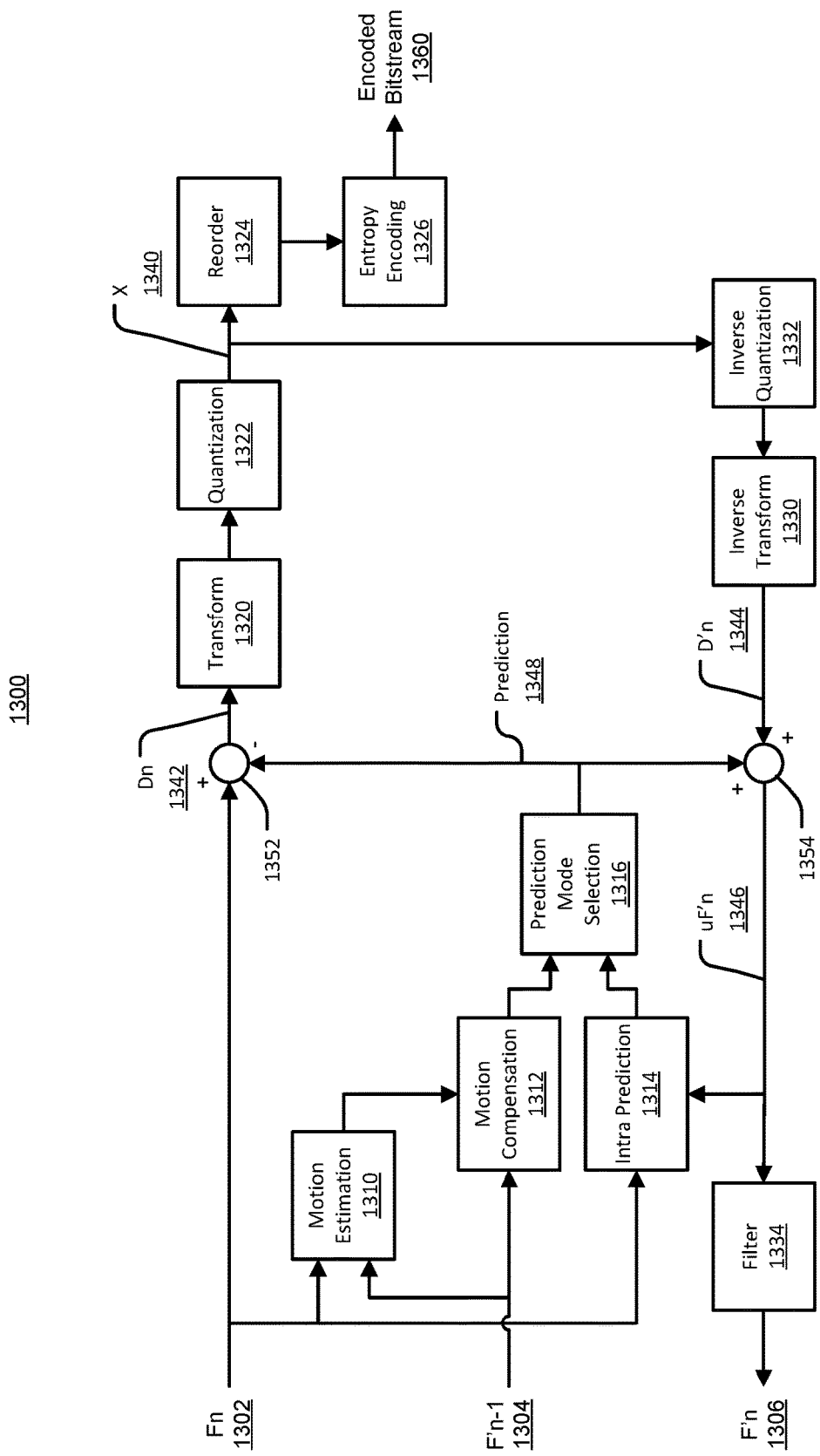
FIG. 13 is a block diagram illustrating an example of an encoding device.

FIG. 13 is a block diagram illustrating an example of an encoding device 1300. The example encoding device 1300 can be implemented, for example, using an integrated circuit, with different components of the integrated circuit performing the operations discussed below. The encoding device 1300 takes as input video frames and outputs an encoded bitstream 1360. The current video frame being encoded is designated in FIG. 13 as Fn 1302. In various examples, the current video frame, Fn 1302, may be partitioned into macroblocks prior to being input into the encoding device 1300. The macroblocks of Fn 1302 are input, in raster scan order, in the encoding device 1300 to be encoded in an intra mode using a intra prediction 1314 unit, or inter mode using a motion estimation 1310 unit and a motion compensation 1312 unit. The encoding device 1300 selects between the possible inter mode prediction and inter mode prediction using a prediction mode selection 1316, which outputs a prediction 1348.

For intra-mode prediction, a block from Fn 1302 is input into the intra prediction 1314 unit along with samples in the current slice that have been previously encoded, decoded, and reconstructed. In FIG. 13, a frame reconstructed from Fn 1302 is designated F'n 1306, and an unfiltered version of the reconstructed frame is designated uF'n 1346. The unfiltered reconstructed frame, uF'n 1346, is used for the intra-prediction. The intra prediction 1314 tests blocks in the slice, which are referred to as reference blocks against the input block to find a reference block that is most similar to the input block. The reference blocks that are tested may be but need not be neighbors of the input block. In various examples, the size of the input block and where the reference block are taken from can be determined by an inter-prediction mode. In some examples, the intra prediction 1314 tries all available intra-prediction modes. In some examples, the intra prediction 1314 may be configured to try only some intra-prediction modes. The encoding device 1300 may select the intra-prediction mode that minimizes the difference between the prediction 1348 resulting from the mode and the original input block.

For inter-prediction, a block from Fn 1302 is input into the motion estimation 1310 unit. Motion estimation of the block includes finding a sample region in a reference frame that closely matches (e.g., is most similar to) the input block. The reference frame is a previously encoded frame, and is designated F'n−1 1304 in FIG. 13. The reference frame can be before or after Fn 1302 in display order. The motion estimation 1310 can search an area in the reference frame, F'n−1 1304, which can be referred to as the search area, for a block (referred to as a reference block) that is the best match with the input block. The search area can be centered around the position of the input block. The size of the block and the size of the search area can be determined by an inter-prediction mode. In various examples, the motion estimation 1310 can use all available modes, and can select the inter-prediction mode that results in a prediction 1348 that is most similar to the input block.

The encoding device 1300 inputs the reference block determined by the motion estimation 1310 into the motion compensation 1312 unit. The motion compensation 1312 determines the position of the reference block relative to the input block, and describes the difference (if any) using a motion vector. A motion vector can have a vertical and a horizontal component. In some examples, the motion estimation 1310 uses integer pixel locations when selecting reference blocks, in which case the components of the motion vector will be integers. In some examples, the motion estimation 1310 can use sub-pixel (also referred to as sub-pel) locations, in which one or both components of the motion vector can be fractional.

The prediction mode selection 1316 can select whether an intra mode or an inter mode is used to encode a particular macroblock. Various factors can determine whether the prediction mode selection 1316 enables intra mode or inter mode, such as the current frame's order in the picture order count, a target compression rate for the encoded bitstream 1360, how well the reference block selected by the motion estimation 1310 or the intra prediction 1314 matching the input block, and/or other factors. The encoding device 1300 subtracts the reference block selected by the prediction mode selection 1316 from the input block using a first summer 1352. The output of the first summer 1352 is a residual block and is designated Dn 1342 in FIG. 13.

The residual block, Dn 1342, undergoes a transform, in a transform 1320 unit. The transform 1320 can convert the Dn 1342 into another domain, referred to as the transform domain. The transform function that is used can depend on various factors, such as whether the data in the transform domain can be separated into components with minimal inter-dependence, whether the data in the transform domain is compact, whether the transform function is reversible, and/or whether the transform function is computationally low cost (e.g., has a low memory requirement, does not require high-precision arithmetic, does not require many operations, etc.), among other factors. Discrete Cosine Transform (DCT) is an example of one transform function that can be used.

The transform coefficients output by the transform 1320 are then quantized using a quantization 1322 unit. The quantization 1322 maps values within a first range of possible values to a second range that is a smaller number of possible values. The quantization 1322 can reduce the precision of the image data, for example by removing near-zero values. A simple example of a scalar quantization is rounding a fractional number to the nearest integer. This process is not reversible, however, since it is not possible to determine the exact value of the original fractional number from the rounded integer. A general example of a uniform quantizer is as follows:

$$FQ = \text{round}\left(\frac{y}{QP}\right)$$

$$X = FQ \times QP$$

In the preceding equations, FQ stands for "forward quantizer," y is a transform coefficient output by the transform 1320, and X is a quantized level output by the quantization 1322. QP is a quantization step size. The quantized output levels can be spaced at uniform intervals of QP. The inverse quantization 1332 unit performs the inverse of the quantization 1322, or, more accurately, performs a re-scaling of the quantized values, since the quantization is not reversible.

The QP value can be used to adjust the compression efficiency and the quality of the video that is reconstructed from the encoded bitstream 1360. When the QP value is large, the range of quantized values is small and can therefore be efficiently represented (e.g., highly compressed), but the re-scaled values are a crude approximation of the original data. When the QP value is small, the re-scaled values match the original data more closely but a larger range of quantized values is produced, which reduces compression efficiency.

The quantized transform coefficients, designated X 1340 in FIG. 13, should be encoded as compactly as possible. The output of the quantization 1322 may be a sparse array containing a few non-zero coefficients and a large number of zero-value coefficients. The reorder 1324 unit an apply various techniques to reorder the coefficients in a manner that can be more compactly encoded. For example, the reorder 1324 can group together non-zero coefficients.

The entropy encoding 1326 unit coverts the reordered coefficients, output by the reorder 1324 unit, into the encoded bitstream 1360. The entropy encoding 1326 can apply various techniques to perform the encoding, such as Huffman coding or a Huffman-based coding. As another example, the entropy encoding 1326 can apply an arithmetic coding techniques. The encoding performed by the entropy encoding 1326 can generate a more compact representation of the reordered coefficients, in most cases without a loss of data.

The path from current input frame, Fn 1302 to the encoded bitstream 1360 can be described as the forward path of the encoding device 1300. The path from the quantized transform coefficients, X 1340, to the reconstructed frame, F'n 1306 can be described as the reverse path. The encoding device 1300 include the reverse path so that reconstructed frames are available for performing prediction. Reconstructed frames are used so that the encoding device 1300 is using the same frames as the basis for prediction as a decoding device would use.

Generating a reconstructed frame, F'n 1306, includes inputting the quantized transform coefficients, X 1340, into an inverse quantization 1332 unit, which, as noted above, re-scales the quantized transform coefficients to be approximate equal to the pre-quantized values. The re-scaled coefficients are then input into an inverse transform 1330 unit, which performed the inverse of the transform function performed by the transform 1320. The output of the inverse transform 1330 is a reconstructed residual block, designated D'n 1344 in FIG. 13. The reconstructed residual block, D'n 1344, can be summed, using a second summer 1354, with the prediction 1348 generated by the intra-prediction or the inter-prediction. The result of the summing is a reconstructed block, which can be included in an unfiltered reconstructed frame, uF'n 1346, which can be used for performing further intra-prediction.

A filter 1334 may be applied to uF'n 1346 to reduce distortion that may result from dividing the input frame into blocks. The filter 1334 can smooth the edges of blocks, thereby improving the appearance of a reconstructed frame. Filtered frames are used for motion-compensated prediction of future frames because the filtered frames maybe a more faithful reproduction of the original frame than might be an unfiltered frame.

In some examples, the encoding device 1300 may store one or more reconstructed frames for possible use as reference frames. The reconstructed frames may be stored in a picture buffer. In some examples, the encoding device 1300 may store the reconstructed frames in separate groups for list 0 and list 1, or may otherwise identify reconstructed frames as belonging to list 0 or list 1.

Figure 14:
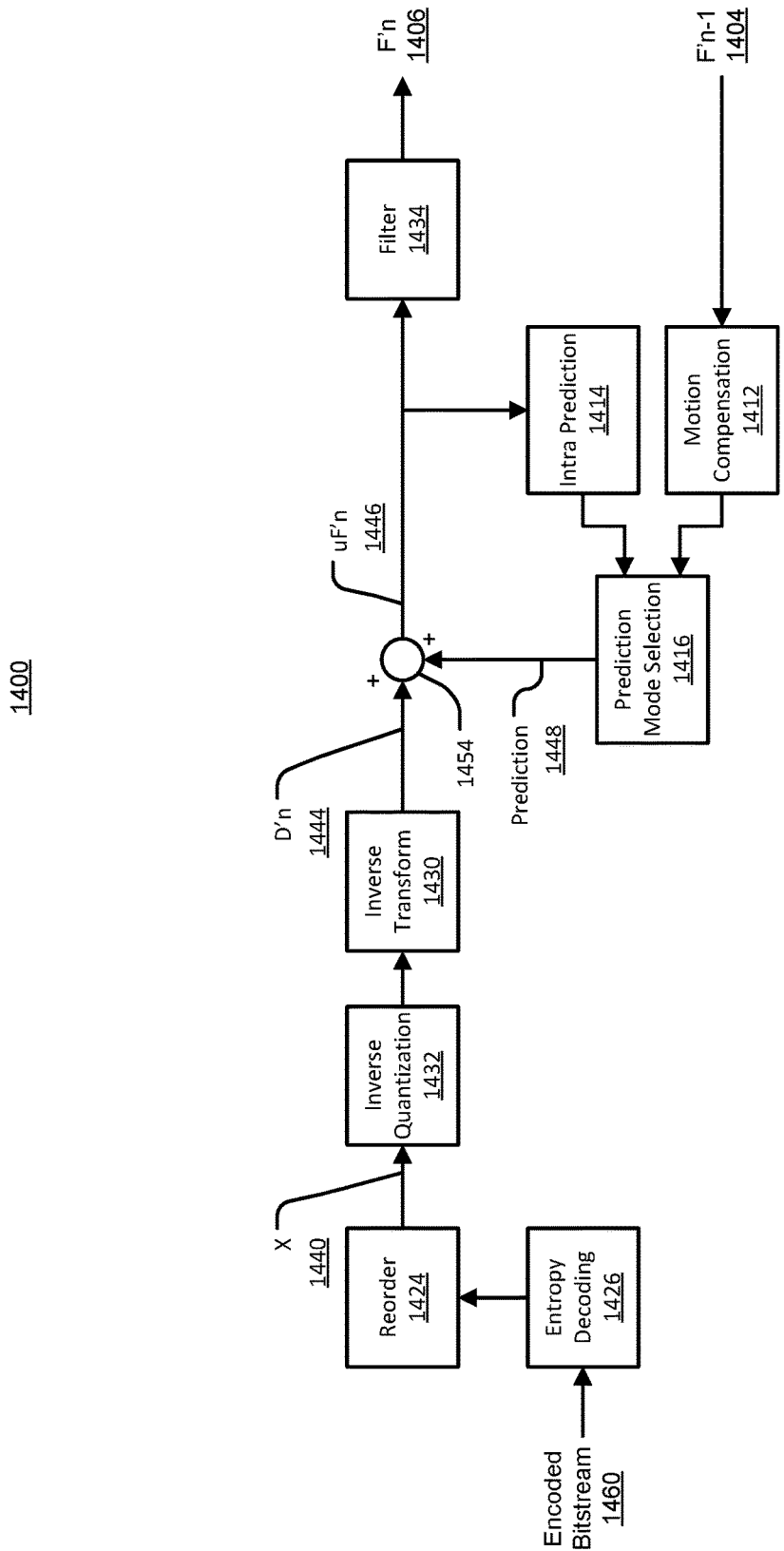
FIG. 14 is a block diagram illustrating an example of a decoding device.

FIG. 14 is a block diagram illustrating an example of a decoding device 1400. The example decoding device 1400 can be implemented, for example, using an integrated circuit, with different components of the integrated circuit performing the operations discussed below. In various examples, the decoding device 1400 receives an encoded bitstream 1460 that includes compressed video data. The encoded bitstream 1460 may be received from a storage device, such as a hard drive, or from a network. The decoding device 1400 uses the data in the encoded bitstream 1460 to reconstruct the video data.

As discussed above, the example encoding device 1300 of FIG. 13 encodes a frame and then reconstructs the frame to use the frame for performing predictions. In various examples, the example decoding device 1400 of FIG. 14 can reconstruct frames in a similar manner as does an encoding device.

In various examples, the decoding device 1400 first inputs the encoded bitstream 1460 into an entropy decoding 1426 unit. The entropy decoding 1426 can perform a similar algorithm as is performed by the entropy decoding 1426 of FIG. 13, such as a Huffman coding or an Arithmetic coding, but performs a decoding instead of an encoding.

The symbols output by the entropy encoding 1426 are quantized transform coefficients, though possibly not in a proper order. A reorder 1424 unit can put the coefficients into a proper order, using data provided in the encoded bitstream 1460. The reorder 1424 can output the quantized transform coefficients, designated X 1440 in FIG. 14, that were generated during encoding.

The decoding device 1400 next inputs the quantized transform coefficients into an inverse quantization 1432 unit to produce transform coefficients, which are then input into an inverse transform 1430 unit, which can re-scale the transform coefficients to approximately their original value. The result is a reconstructed residual block, designated D'n 1444 in FIG. 14.

The decoding device 1400 adds the reconstructed residual block to a prediction 1448 using a summer 1454. The resulting reconstructed block can be included in an unfiltered reconstructed frame, designated uF'n 1446 in FIG. 14. The decoding device 1400 obtains the prediction 1448 by performing intra prediction (using an intra prediction 1414 unit) using reference blocks from the current slice, or by performing inter-prediction (using a motion compensation 1412 unit) using as reference frames prior reconstructed frames. The prior reconstructed frames, designated F'n−1 1404, can be before or after the current frame in display order. Whether the decoding device 1400 should perform intra-prediction or inter-prediction for a particular block can be indicated in the encoded bitstream 1460. A prediction mode selection 1416 can select between intra-prediction and inter-prediction.

The intra prediction 1414 operates by finding, in the unfiltered reconstructed frame, uF'n 1446, a reference block, where the reference block can be identified from information provided in the encoded bitstream 1460. The motion compensation 1412 finds a reference block by identifying the reference frame or frames used for to formulate the prediction, and using a motion vector to identify a reference block in the reference frame or frames.

The decoding device 1400 can input the unfiltered reconstructed frame into a filter 1434 unit, which can smooth out distortions caused by dividing the video frame into blocks. The output of the filter 1434 is a reconstructed frame, designated F'n 1406, which is suitable for display.

In some examples, the decoding device 1400 can store one or more reconstructed frames for possible use as reference frames. The reconstructed frames may be stored in a picture buffer. Reconstructed frames for list 0 and list 1 may be stored separately, or may be designated as being in list 0 or list 1.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle Microsoft Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing device, comprising:
    an integrated circuit device operable to perform video coding on video data;
    a memory operable to store encoded frames of video data; and
    a bus coupling the integrated circuit device to the memory, the bus having a bandwidth for transferring data from the memory to the integrated circuit device;
    wherein the integrated circuit device comprises:
        a bandwidth determination circuit operable to monitor transactions sent to the memory and to determine an amount of the bandwidth that is available at a point in time;
        an inter-prediction mode selection circuit operable to:
            obtain from the bandwidth determination circuit, at a current point in time, a particular amount of the bandwidth that is available on the bus;
            determine a particular amount of bandwidth allocated for coding the video data;
            determine, using a current amount of the bandwidth and the particular amount of the bandwidth, an available amount of bandwidth for obtaining reference data from the memory, the current amount of the bandwidth being less than the particular amount of bandwidth;
            select an inter-prediction mode from a plurality of inter-prediction modes, wherein the inter-prediction mode is selected based on a size of a reference window associated with the inter-prediction mode, the size being within an amount of data that can be read from the memory using the available amount of bandwidth;
            cause the reference window to be read from the memory and into the integrated circuit device; and
        a motion estimation circuit operable to use the reference window to perform inter-prediction for a block of the video data, wherein motion estimation circuit uses the inter-prediction mode to perform the inter-prediction.

2. The computing device of claim 1, wherein a respective inter-prediction mode of the plurality of inter-prediction modes determines a size of a respective reference window associated with the respective inter-prediction mode.

3. The computing device of claim 1, wherein the block of the video data is from a current frame being coded by the integrated circuit device, wherein the plurality of inter-prediction modes use a reference frame to perform prediction, wherein the reference frame is temporally before or after the current frame, and wherein the reference window includes a portion of the reference frame.

4. The computing device of claim 1, wherein the bandwidth determination circuit determines the amount of bandwidth that is available based on coding of previous blocks of the video data.

5. The computing device of claim 1, wherein the bandwidth determination circuit determines the amount of bandwidth that is available based on a number and sizes of transactions previously sent to the memory.

6. An integrated circuit device, comprising:
    a memory interface operable to communicate with an external memory, the memory interface having a bandwidth to the external memory;

a bandwidth determination circuit operable to determine an amount of the bandwidth that is available at a point in time;

an inter-prediction mode selection circuit operable to:
  determine, at a particular point in time, a particular amount of the bandwidth that is available for obtaining reference data from the external memory;
  select an inter-prediction mode from a plurality of inter-prediction modes, wherein the inter-prediction mode is selected based on a size of a reference window associated with the inter-prediction mode, the size being within an amount of data that can be read from the external memory using the particular amount of the bandwidth available at the particular point in time; and
  cause the reference window to read from the external memory; and a motion estimation circuit operable to perform inter-prediction for a block of video data using the inter-prediction mode and the reference window.

7. The integrated circuit device of claim 6, wherein the inter-prediction mode selection circuit is further operable to:
  determine, for a second inter-prediction mode from the plurality of inter-prediction modes, a second size of a second reference window associated with the second inter-prediction mode;
  determine that the second size is larger than the amount of data that can be read from the external memory using the particular amount of the bandwidth; and
  remove the second inter-prediction mode from consideration in selecting the inter-prediction mode.

8. The integrated circuit device of claim 6, wherein the inter-prediction mode selection circuit is further operable to:
  determine a search area size for performing prediction for the block of the video data, the search area size being within the amount of data that can be read from the external memory using the available amount of the bandwidth; and
  reduce the size of the reference window to the search area size before causing the reference window to be read from the external memory, the search area size being less than a maximum reference window size associated with the inter-prediction mode.

9. The integrated circuit device of claim 6, wherein the inter-prediction mode selection circuit is further operable to:
  determine a number of times the motion estimation circuit is to search the reference window for a reference block matching the block of the video data, the number of times corresponding to a search area size; and
  reduce the size of the reference window to the search area size before causing the reference window to be read from the external memory, the search area size being less than a maximum reference window size associated with the inter-prediction mode.

10. The integrated circuit device of claim 6, wherein the inter-prediction mode selection circuit is further operable to:
  determine an increase in the size of the reference window needed to perform a sub-pixel search; and
  disable the sub-pixel search based on the increase in the size of the reference window resulting in the size of the reference window being greater than the amount of data that can be read from the external memory using the particular amount of the bandwidth.

11. The integrated circuit device of claim 6, wherein the inter-prediction mode selection circuit is further operable to:
  determine a prediction mode used to predict a neighbor block of the block of the video data, wherein the inter-prediction mode selection circuit selects the inter-prediction mode based on the prediction mode used to predict the neighbor block.

12. The integrated circuit device of claim 6, wherein the inter-prediction mode selection circuit is further operable to:
  determine that each previously coded neighbor block of the block of the video data was predicted using an intra-prediction mode, wherein the inter-prediction mode selection circuit selects the inter-prediction mode based on the size of the reference window.

13. The integrated circuit device of claim 6, wherein the inter-prediction mode selection circuit is further operable to:
  determine that encoding parameters of neighboring blocks is not available, wherein the inter-prediction mode selection circuit selects the inter-prediction mode based on the size of the reference window.

14. The integrated circuit device of claim 6, wherein the block of the video data is from a current frame being coded, and wherein the inter-prediction mode selection circuit is further operable to:
  determine a reference frame for performing prediction for the block of the video data; and
  determine a prediction mode used to predict a second block of the video data, the second block of the video data being from the reference frame, wherein the second block of the video data is in a same location in the reference frame as is the block of the video data in the current frame, and wherein the inter-prediction mode selection circuit further selects the inter-prediction mode based on the prediction mode used to predict the second block of the video data.

15. The integrated circuit device of claim 6, wherein the inter-prediction mode selection circuit is further operable to:
  select a second inter-prediction mode from the plurality of inter-prediction modes;
  determine that a second reference window associated with the second inter-prediction mode includes a portion of the reference window; and
  configure the motion estimation circuit to perform inter-prediction for the block of the video data using the second inter-prediction mode and the reference window.

16. A computer-implemented method, comprising:
  determining, by an integrated circuit device, a particular amount of bandwidth that is available for obtaining reference data from an external memory, wherein a fixed amount of bandwidth is available to the integrated circuit device for obtaining data from the external memory, and wherein the particular amount of bandwidth is determined at a particular point in time;
  selecting an inter-prediction mode from a plurality of inter-prediction modes, wherein the inter-prediction mode is selected based on a size of a reference window associated with the inter-prediction mode, the size being within an amount of data that can be read from the external memory using the particular amount of the bandwidth available at the particular point in time;
  reading the reference window from the external memory; and
  performing prediction for a block of video data using the inter-prediction mode and the reference window.

17. The computer-implemented method of claim 16, further comprising:
  determining a search area size, the search area size being within the amount of data that can be read from the external memory using the particular amount of bandwidth; and reducing the size of the reference window to the search area size before reading the reference frame from the external memory.

18. The computer-implemented method of claim 16, wherein the inter-prediction mode is selected based on one or more prediction modes used to predict one or more neighboring blocks of the block of the video data.

19. The computer-implemented method of claim 16, wherein the block of the video data is associated with a video stream from a plurality of video streams being coded by the integrated circuit device, and wherein a portion of the fixed amount of bandwidth is allocated to each of the plurality of video streams.

20. The computer-implemented method of claim 16, wherein the block of the video data is associated with a video stream from a plurality of video streams being coded by the integrated circuit device, and wherein the particular amount of bandwidth is less than the fixed amount of bandwidth due to the multiple of the plurality of video streams being coded simultaneously.

21. The computer-implemented method of claim 16, wherein the particular amount of bandwidth is less than the fixed amount of bandwidth due to a portion of the fixed amount of bandwidth having previously been used to read reference data from the external memory.

* * * * *